US006286083B1

(12) United States Patent
Chin et al.

(10) Patent No.: US 6,286,083 B1
(45) Date of Patent: Sep. 4, 2001

(54) COMPUTER SYSTEM WITH ADAPTIVE MEMORY ARBITRATION SCHEME

(75) Inventors: Kenneth T. Chin, Cypress; Jerome J. Johnson; Phillip M. Jones, both of Spring; Robert A. Lester, Houston; Gary J. Piccirillo, Cypress; Jeffrey C. Stevens, Spring; Michael J. Collins, Tomball, all of TX (US); C. Kevin Coffee, Pepperbrook, FL (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/112,000

(22) Filed: Jul. 8, 1998

(51) Int. Cl.$^7$ ...................................................... G06F 13/18
(52) U.S. Cl. .............................. 711/151; 710/41; 710/116; 710/241
(58) Field of Search .................................... 711/150, 151, 711/158; 710/41, 42, 44, 113, 116, 241, 244

(56) References Cited

U.S. PATENT DOCUMENTS

| | | | |
|---|---|---|---|
| 5,634,073 | 5/1997 | Collins et al. ............................. | 710/5 |
| 5,805,840 | * 9/1998 | Dutton ..................................... | 710/116 |
| 5,809,278 | * 9/1998 | Watanabe et al. ....................... | 711/150 |
| 5,862,355 | * 1/1999 | Logsdon ................................. | 710/116 |
| 5,956,493 | * 9/1999 | Hewitt et al. .......................... | 710/113 |
| 6,000,001 | * 12/1999 | Larson .................................... | 710/244 |
| 6,006,303 | * 12/1999 | Barnaby et al. ........................ | 710/244 |
| 6,016,528 | * 1/2000 | Jaramillo et al. ...................... | 710/243 |

OTHER PUBLICATIONS

VLSI Digital Signal Processors by Vijay K. Madisetti (Georgia Institute of Technology) Chapter 3, pp. 61–63; Butterworth–Heinemann, 1995.

* cited by examiner

Primary Examiner—Hiep T. Nguyen
Assistant Examiner—Gary J. Portka
(74) Attorney, Agent, or Firm—Conley, Rose & Tayon, P.C.; Michael F. Heim; Jonathan M. Harris

(57) ABSTRACT

A computer system includes an adaptive memory arbiter for prioritizing memory access requests, including a self-adjusting, programmable request-priority ranking system. The memory arbiter adapts during every arbitration cycle, reducing the priority of any request which wins memory arbitration. Thus, a memory request initially holding a low priority ranking may gradually advance in priority until that request wins memory arbitration. Such a scheme prevents lower-priority devices from becoming "memory-starved." Because some types of memory requests (such as refresh requests and memory reads) inherently require faster memory access than other requests (such as memory writes), the adaptive memory arbiter additionally integrates a non-adjustable priority structure into the adaptive ranking system which guarantees faster service to the most urgent requests. Also, the adaptive memory arbitration scheme introduces a flexible method of adjustable priority-weighting which permits selected devices to transact a programmable number of consecutive memory accesses without those devices losing request priority.

26 Claims, 8 Drawing Sheets

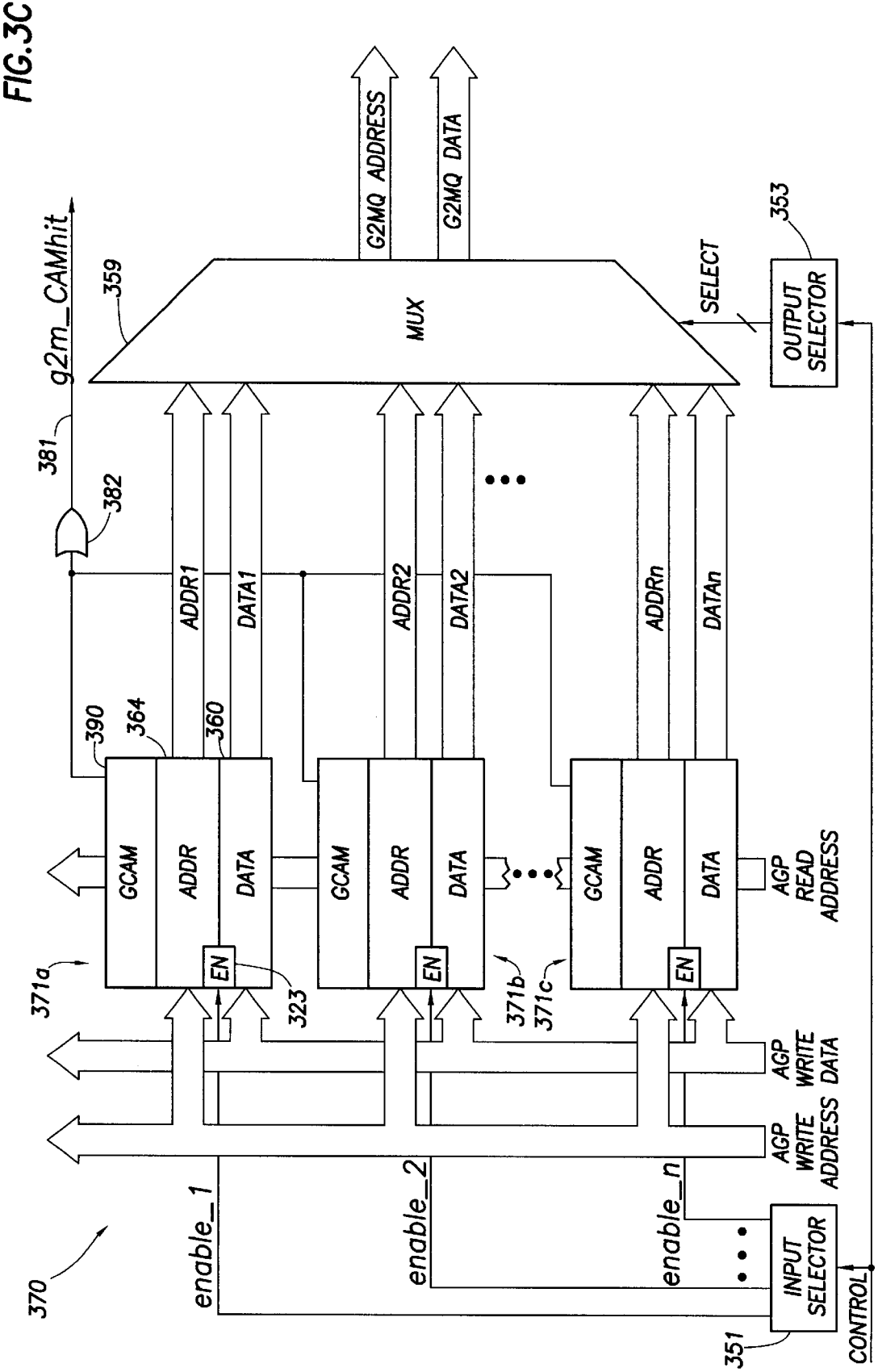

COMPUTER SYSTEM WITH ADAPTIVE MEMORY ARBITRATION SCHEME

BACKGROUND OF THE INVENTION

1. Field of the Invention

The present invention relates generally to memory systems in a personal computer system. More particularly, the present invention relates to the manner and techniques by which memory is accessed by components in a computer system. Still more particularly, the invention relates to an improved technique for arbitrating among multiple pending memory requests.

2. Background of the Invention

Modern computer system generally include a plurality of devices interconnected through a system of buses which are linked by way of one or more hubs, or bridge logic units. For example, a conventional computer system typically contains a central processing unit ("CPU") or processor coupled through bridge logic to main memory. A CPU bus usually couples the CPU to the bridge logic, and a memory bus connects the bridge logic to the memory. The bridge logic typically incorporates a memory controller which receives memory access requests and generates the standard control signals necessary to access the main memory. The bridge logic may also include an interface to a high bandwidth local expansion bus, such as the Peripheral Component Interconnect ("PCI") bus. Examples of devices which link to the local expansion bus include network interface cards, video accelerators, audio cards, SCSI adapters, and telephony cards, to name a few. An example of such a bridge logic is described in U.S. Pat. No. 5,634,073, assigned to Compaq Computer Corporation.

Bridge logic may also support an older-style expansion bus through an additional bus interface to provide compatibility with earlier-version expansion bus adapters. Examples of such expansion buses include the Industry Standard Architectures (ISA) bus, the Extended Industry Standard Architecture ("EISA") bus, and the Microchannel Architecture (MCA) bus. Various devices may be coupled to this second expansion bus including a fax/modem, sound card, keyboard, and other peripherals. The bridge logic can link or interface more than simply the CPU bus, a peripheral bus such as a PCI bus, and the memory bus. In graphics-intensive applications, bridge logic may support a separate peripheral bus optimized for graphics related data transfers. A popular example of such a bus is the Advanced Graphic Port ("AGP") bus.

Because many of the devices interconnected through this series of buses function independently of each other, they often attempt to access common resources concurrently. For example, a device coupled to the AGP bus may need to extract data from main memory to drive a video display at the same time the CPU is requesting instructions stored in main memory that allow the video program to run. Both actions require memory access, and the memory controller must choose which device (the CPU or the AGP device in this example) to service first. Such conflicts necessitate arbitration, in which priority ratings are assigned to rank memory requests and allow the memory controller to service memory requests by order of importance.

Since computer systems have traditionally been developed for business applications including word processing and spreadsheets, among others, the arbitration schemes within such systems have generally been geared to guarantee the highest memory access priority to a single device (such as the CPU), with lower priority rankings assigned to the remaining devices in the computer. Using such a fixed priority scheme, a memory controller, if faced with multiple pending memory access requests, simply grants memory access to the device with the highest priority, traditionally the CPU. A fixed-priority arbitration scheme is generally well-suited to the more traditional computer application programs, which tend to involve relatively minor levels of user input, device interaction, and graphics output.

Recently, however, computer systems have been increasingly employed in processing real-time data, including multimedia applications such as video and audio, telephony, and speech recognition. The performance of these applications suffers if the computer cannot process the real-time data within a minimum time period. When the CPU or other highly prioritized device issues numerous memory access requests, the memory controller is prevented from granting access to lower-ranking devices, even if those devices are processing real-time data. Until the high-priority devices stop issuing memory access requests, the low-priority real-time applications are forced to stall and wait for access to memory. Accordingly, fixed-priority memory arbitration techniques may be unacceptable for real-time applications, such as video, where unintended pauses in the on-screen action can ruin the effect of a moving picture, or in speech recognition, where failure to capture portions of the speech data can prevent the computer from recognizing what a speaker said. Hence, fixed memory arbitration schemes often are inadequate to support the memory demands of emerging computer applications.

The Least-Recently-Used (LRU) algorithm, in which a memory arbiter grants the request which has least recently been granted, is one alternative to fixed arbitration schemes since the priority structure of an LRU scheme may change in response to the memory request sequence. However, this type of responsive priority change essentially equalizes, or fixes, the priority of all devices in the computer system, since the arbitration scheme does not take into account the urgency associated with memory transactions from certain devices. Further, the devices which use memory infrequently actually tend to experience shorter waits for memory access, since these devices are less likely to have recently accessed memory than are devices which access memory more frequently. As a consequence, real-time applications and devices, which need frequent and quick access to memory, may consistently lose memory arbitration to other devices under an LRU scheme. Hence, an LRU scheme, while more equitable that a fixed scheme, lacks the flexibility to allow the computer system designer to directly set the memory request priorities.

For the foregoing reasons, it would be advantageous to design a computer system that includes a bus bridge architecture that permits all devices in a computer system fair access to memory, without incurring the drawbacks of current arbitration methods. A memory controller with an equitable, yet configurable, arbitration scheme could dramatically improve the quality of service associated with memory accesses in modern computer applications. Despite the apparent advantages that such a system would provide, to date no such system has been developed that provides these features.

SUMMARY OF THE INVENTION

The deficiencies of the prior art described above are solved in large part by a computer system configured in accordance with the present invention. The computer system of the present invention preferably includes a processor, a memory device, two expansion buses, and a bridge logic unit coupling together the CPU, the memory device and the expansion buses. The bridge logic unit incorporates a memory controller implementing an adaptive (or "dynamic") memory-request arbitration scheme. The CPU couples to the bridge logic unit via a CPU bus and the memory device couples to the bridge logic unit via a memory bus. In accordance with an embodiment of the invention, one expansion bus is implemented as a peripheral component interconnect ("PCI") bus and the other expansion bus is an accelerated graphics port ("AGP") bus. The bridge logic unit generally routes bus cycle requests from one of the four buses (CPU, memory, PCI, AGP) to another of the four buses while concurrently routing bus cycle requests between other pairs of buses. In addition to the ability to concurrently route bus cycle requests, the bridge logic unit also has the circuitry necessary to implement an adaptive memory access arbitration scheme.

The bridge logic unit preferably includes a CPU interface, a memory controller, an AGP bus interface, and a PCI bus interface. Each pair of interfaces (including the memory controller) preferably are coupled by at least one queue. The queues temporarily store read data and/or write requests, with the write requests comprising write addresses and write data. Accordingly, the bridge logic unit includes a plurality of write queues for storing write requests from one interface to another and a plurality of read queues for storing read data between interfaces. By way of example, the CPU, PCI, and AGP interfaces couple to the memory controller via write queues in which each interface can concurrently store (or "post") memory write requests. The queues preferably provide the capacity to store two or more write requests (for the write queues) or read data streams (for the read queues).

Because each interface may communicate concurrently with all other interfaces (including the memory controller) via the read and write queues, the possibility exists that a first interface cannot access main memory because main memory is processing read or write requests from a second interface. For example, a device coupled to the PCI bus may not be able to read from memory because the CPU is currently writing data to memory. In such a situation, the PCI device may become "starved" for memory access. To remedy such problems, the bridge logic unit contains a memory controller capable of mediating between memory requests. The memory controller implements an adaptive arbitration scheme that updates memory request priority rankings regularly, in order to favor the memory requests that have been refused service during previous memory cycles. In such an arbitration system, requests that are refused service receive progressively higher priority rankings. Requests initially having low priority thereby advance in priority until they are granted service. Such an arbitration system keeps the memory controller from ignoring some memory requests indefinitely and therefore prevents any device in the computer system from becoming starved for memory access.

Thus, the present invention comprises a combination of features and advantages which enable it to overcome various problems of prior devices. The various characteristics described above, as well as other features, will be readily apparent to those skilled in the art upon reading the following detailed description of the preferred embodiments of the invention and by referring to the accompanying drawings.

BRIEF DESCRIPTION OF THE DRAWINGS

A better understanding of the present invention can be obtained when the following detailed description of the preferred embodiment is considered in conjunction with the following drawings, in which:

FIG. 3C is a block diagram of the preferred embodiment of the AGP-to-memory write queue of FIG. 2;

DETAILED DESCRIPTION OF A PREFERRED EMBODIMENT

Figure 1:
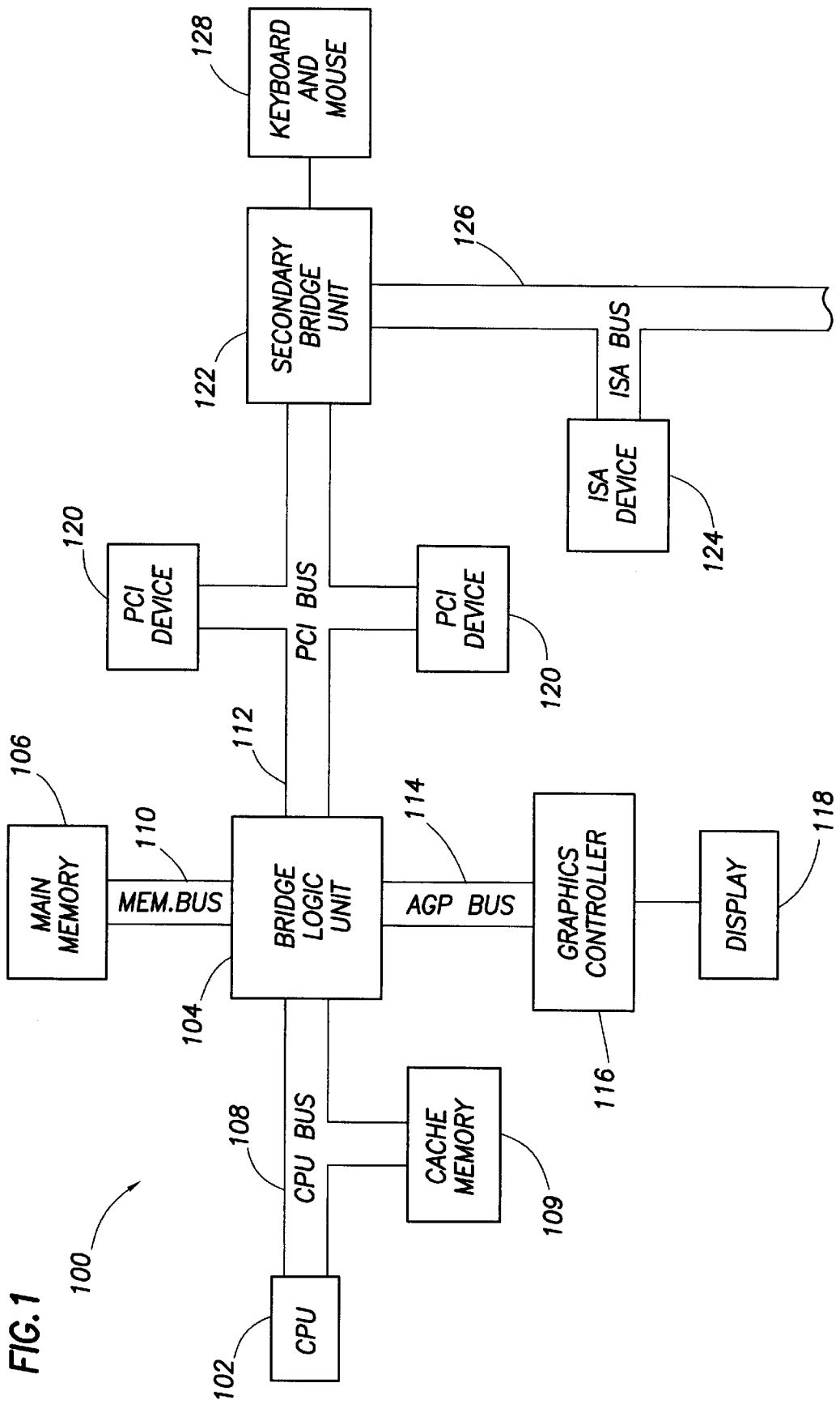
FIG. 1 is a block diagram of a computer system including an integrated bridge logic unit.

Referring now to FIG. 1, a computer system 100 constructed in accordance with a preferred embodiment generally includes a central processing unit ("CPU") 102 coupled to a variety of system components through an integrated bridge logic (or "North bridge") unit 104. The CPU 102 couples to the North bridge 104 via a CPU bus 108. An external cache memory unit 109 may further be coupled to CPU bus 108. As shown, a main memory 106 couples to the North bridge 104 through a memory bus 110, and a graphics controller 116 couples to the North bridge 104 through any suitable graphics bus 114, such as an Advanced Graphics Port ("AGP") bus. A display device 118 couples to the graphics controller 116. Additionally, a plurality of Peripheral Component Interconnect ("PCI") devices 120 couple to the North bridge 104 through a PCI bus 112.

A secondary bridge (or "South bridge") logic unit 122 also may be provided to accommodate an electrical interface to one or more peripheral devices 124 by way of an expansion bus 126. The expansion bus 126 may be implemented using any suitable bus type such as an Industry Standard Architecture ("ISA") bus or an Extended Industry Standard Architecture bus ("EISA"). As the exemplary embodiment of FIG. 1 shows, expansion bus 126 is implemented as an ISA bus and, accordingly, peripheral device 124 represents an ISA device such as a fax/modern or sound card.

In addition to providing an interface to an ISA or ELISA bus, South bridge 122 may further incorporate additional functionality, as desired. For example, in one embodiment, South bridge 122 includes a master PCI arbiter (not shown) for arbitrating ownership of the PCI bus 112. South bridge 122 may also incorporate a disk drive controller, an interrupt controller, and power management support functionality. An input/output controller (not shown), either external from or integrated with the South bridge 122, may also be included within computer system 100 to provide operational support for a keyboard and mouse 128 and for various serial and parallel ports, as desired.

Referring still to FIG. 1, the CPU 102 is illustrative of, for example, a Pentium® Pro Microprocessor. It should be understood, however, that other alternative types of microprocessors could be employed. Further, an embodiment of computer system 100 may include a multiple-CPU architecture, with a plurality of processors coupled through the CPU bus 108 to the North bridge 104.

The main memory 106 generally includes a conventional memory device or array of memory devices in which application programs and data are stored. Computer system 100 includes any suitable type of memory such as dynamic random access memory ("DRAM") or any of the various types of DRAM devices such as synchronous dynamic random access memory ("SDRAM").

The PCI devices 120 may include any of a variety of peripheral devices such as, for example, network interface cards, video accelerators, audio cards, hard or floppy disk drives, Small Computer Systems Interface ("SCSI") adapters and telephony cards. Although only two PCI devices 120 are included in the embodiment illustrated in FIG. 1, it should be recognized that computer system 100 may include any number of PCI devices as desired.

Referring still to FIG. 1, the graphics controller 116 controls the rendering of text and images on display 118. Graphics controller 116 may embody a typical graphics accelerator generally known in the art to render three-dimensional data structures on display 118. These data structures can be effectively shifted into and out of main memory 106. The graphics controller 116 therefore may be a master of the AGP bus 114 in that it can request and receive access to a target interface within the North bridge 104 to thereby obtain access to main memory 106. A dedicated graphics bus accommodates rapid retrieval of data from main memory 106. For certain operations, graphics controller 116 may further be configured to generate PCI protocol transactions on the AGP bus 114. The AGP interface of bridge logic 104 may thus include functionality to support both AGP protocol transactions as well as PCI protocol target and initiator transactions. For the purpose of this disclosure, AGP-related transactions (ie., transactions initiated by or targeted to the AGP bus) following the PCI protocol are referred to as "GCI" transactions. Display 118 is any electronic display device upon which an image or text can be represented. A suitable display 118 may include, for example, a cathode ray tube ("CRT"), a liquid display ("LCD"), a virtual retinal display ("VRD"), a thin film transistor display ("TFT"), or any other type of suitable display device for a computer system.

The following discussion describes an embodiment of computer system 100 for coupling together various computer buses. Computer system 100 can be implemented with respect to the particular bus architectures shown in FIG. 1 (i.e., PCI and AGP buses), or other bus architectures, as desired. The embodiment described herein, however, assumes buses 112 and 114 represent a PCI bus and an AGP bus, as shown in FIG. 1. Further, CPU 102 is assumed to be a Pentium® Pro processor and thus CPU bus 108 represents a Pentium Pro bus®. These bus protocols and the terminology used with respect to these protocols are well known to those of ordinary skill in the art. If a more thorough understanding of the PCI, AGP, or Pentium® Pro buses is desired, reference should be made to the PCI Local Bus Specification (PCI Special Interest Group, 1993), Accelerated Graphics Port Interface Specification (Intel, 1996), and Intel P6 External Bus Specification.

Figure 2:
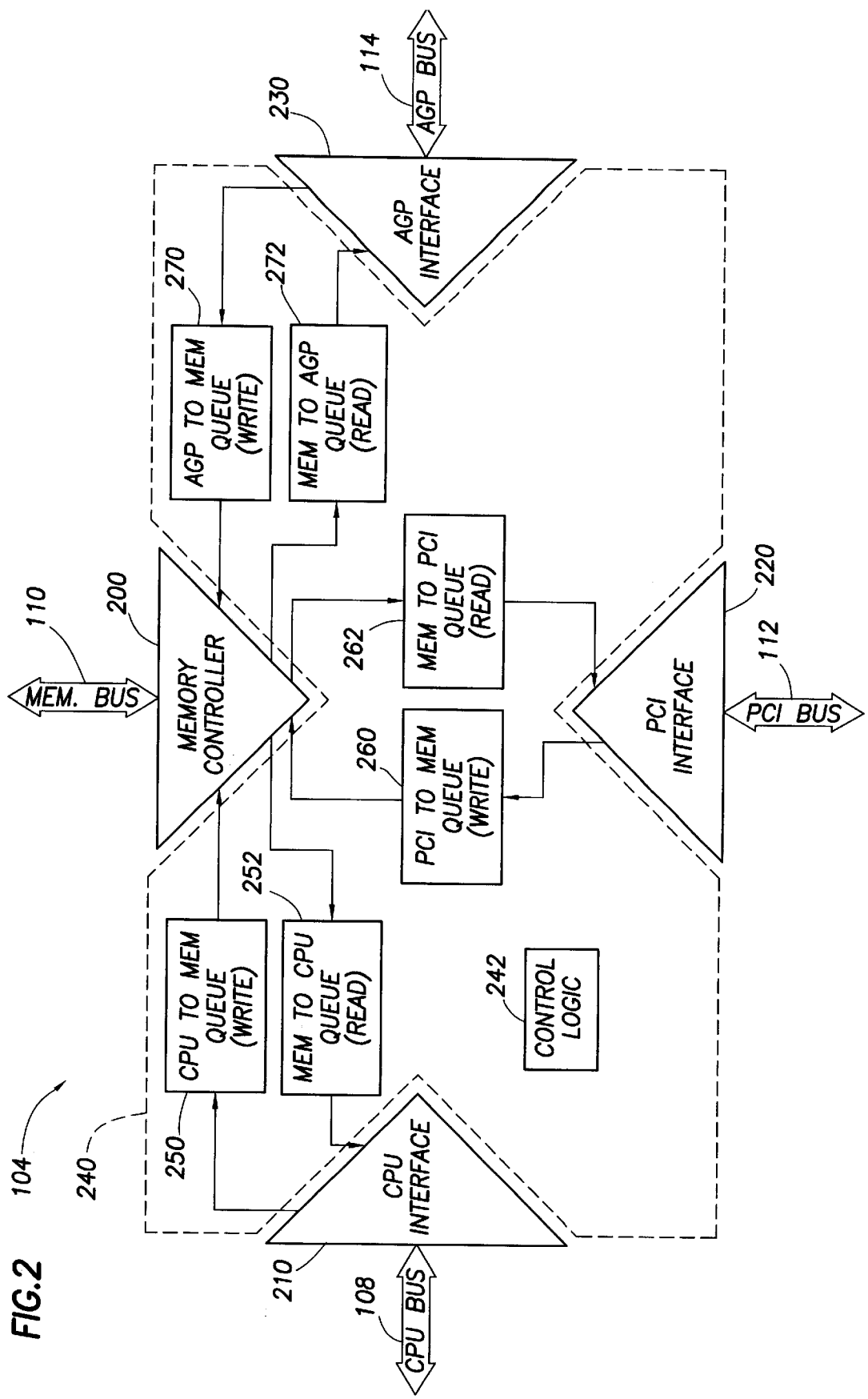
FIG. 2 is a block diagram of an exemplary embodiment of the bridge logic unit of FIG. 1 including CPU, PCI, and AGP interfaces, a memory controller, and data and address queues between the interfaces and memory controller.

Referring now to FIG. 2, North bridge 104 generally includes a memory controller 200, a CPU interface 210, a PCI interface 220, an AGP interface 230, and queue storage and control logic 240. As shown, the CPU interface 210 preferably provides the North bridge 104 with an interface to the CPU bus 108. The AGP interface 230 and PCI interface 220 provide interfaces to the AGP bus 114 and PCI bus 112, respectively. Lastly, the memory controller 200 couples the North bridge 104 to the memory bus 110.

The queue storage and control logic 240 includes various queue storage elements 250, 252, 260, 262, 270, and 272 interconnecting the memory controller 200, CPU interface 210, PCI interface 220, and AGP interface 230. A CPU-to-memory queue (P2M queue) 250 and a memory-to-CPU queue (M2P queue) 252 couple the CPU interface 210 to the memory controller 200. A PCI-to-memory queue (I2M queue) 260 and a memory-to-PCI queue (M2I queue) 262 couple the PCI interface 220 to the memory controller 200. Similarly, an AGP-to-memory queue (G2M queue) 270 and a memory-to-AGP queue (M2G queue) 272 couple the AGP interface 230 to the memory controller 200.

Generally, the queue storage elements allow data and data transaction requests (such as CPU reads and writes to memory, PCI reads and writes to memory, and other requests) to be temporarily stored pending execution by the target device, thereby permitting the requesting device to perform other tasks until its transaction request is completed. Operation and storage of data transactions in the queue storage elements preferably occurs concurrently. Thus, data and data transaction requests among the interfaces 210, 220, 230, and the memory controller 200 may be stored concurrently within the North bridge 104. Concurrent storage of data and transaction requests in the queue storage elements 250, 252, 260, 262, 270, and 272 requires that each queue storage element be capable of holding data and/or transaction requests at the same time that other queue storage elements are holding data and transaction requests.

A control logic unit 242, preferably included as part of the queue storage and control logic 240, directs the operation of the various queue storage elements through a network of standard control signals. For the sake of clarity, these signals are omitted from FIG. 2. Reference may be made to commonly assigned co-pending application entitled "Computer System with Memory Controller and Bridge Interface Permitting Concurrent Operation." The interfaces 210, 220, and 230, the memory controller 200, and any other configuration registers that may be present in the computer system 100 may use these handshaking and configuration signals to add (or "queue") and remove (or "dequeue") data from the queues 250, 252, 260, 262, 270, and 272.

Again referring to FIG. 2, the North bridge 104 preferably supports eleven types of memory requests: memory refresh, memory-to-CPU read (M2P), CPU-to-memory write (P2M), Graphics Address Re-Mapping Table ("GART") memory-to-CPU read (M2PG), memory-to-PCI read (M2I), PCI-to-memory write (I2M), memory-to-GCI read (M2GI), GCI-to-memory write (GI2M), memory-to-GART read (M2GART), memory-to-AGP read (M2G), and AGP-to-memory write (G2M). As mentioned previously, AGP-related transactions (i.e., transactions initiated by or targeted to the AGP bus) following the PCI protocol are referred to as "GCI" transactions. Furthermore, M2G read requests are tagged with an additional priority level of high or low in accordance with the Accelerated Graphics Port Interface Specification, Revision 1.0, Intel Corp. (Jul. 31, 1996). Memory refresh cycles are required when using dynamic random access memory ("DRAM") or synchronous dynamic random access memory ("SDRAM") modules in main memory 106 to prevent the memory modules from losing data. The M2P read request causes data to be read by the CPU 102 from main memory 106. Similarly, a P2M write request results in a transfer of CPU 102 data to main memory 106. The M2PG read request induces a transfer of data to the processor from a portion of main memory 106 reserved for GART translation.

An M2I read request produces a transfer of data from main memory 106 to a device 120 residing on the PCI bus 112, via the PCI interface 220. The I2M write request results in a transfer of data from a PCI device 120 to main memory 106. An M2GI transaction transfers a portion of main memory 106 to the graphics controller 116 on the AGP bus 114, using the PCI protocol. GI2M is a request for a transfer of data from the graphics controller 116 to main memory 106, using the PCI protocol. The M2GART request produces a data transfer from a portion of main memory 106 reserved for GART to the AGP interface 230. An M2G request induces a transfer of data from main memory 106 to the graphics controller 116. Finally, G2M is a data write from the graphics controller 116 to main memory 106.

Referring still to FIG. 2, the CPU interface 210, PCI interface 220, and AGP interface 230 generally originate all of the memory read requests. Specifically, the CPU interface 210 generates the M2P and M2PG requests, the PCI interface 220 generates the M2I requests, and the AGP interface 230 generates the M2G, M2GI, and M2GART requests. When one of the interfaces 210, 220, or 230 asserts a memory read request, the memory controller 200 submits the associated target addresses for the read request to main memory 106. In response, main memory 106 places the read data into the queue connected between the memory controller 200 and the particular interface originating the read request Thus, M2P and M2PG data are placed in the M2P queue 252, data for the M2I requests are stored the M2I queue 262, and data for the M2G, M2G, and M2GART requests are placed in the M2G queue 272.

The interfaces 210, 220, and 230 also supply the addresses and data for write transactions to main memory. The CPU interface 210 provides P2M addresses and data, which are stored in the P2M queue 250 until granted memory access. Likewise, the I2M queue 260 stores the I2M requests submitted by the PCI interface 220, and the G2M queue 270 stores the G2M and GI2M requests submitted by the AGP interface 230. The main memory 106 processes write transactions by dequeueing the data and addresses directly from the queues 250, 260, and 270. The refresh request preferably is generated by the memory controller 200, as described in greater detail with respect to FIG. 3D.

Table I, below, summarizes the memory cycle requests, including the data source, the data destination, and a brief description of the transaction. For instance, a memory-to-processor read (M2P) transfers data from main memory 106 to the CPU 102. Therefore, the data source is main memory 106. The data destination is the CPU 102, since the CPU 102 receives the data from main memory 106. Since the refresh request involves no data transfer, Table I lists "no data" under the data source and data destination columns for that request. The refresh request is preferably initiated directly by the memory controller 200.

TABLE I

Memory Cycle Requests.

| Request | Data Source | Data Destination | Description |
| --- | --- | --- | --- |
| Refresh | no data | no data | prevents memory data loss |

TABLE I-continued

Memory Cycle Requests.

| Request | Data Source | Data Destination | Description |
| --- | --- | --- | --- |
| M2P | main memory 106 | CPU 102 | CPU read |
| P2M | CPU 102 | main memory 106 | CPU write |
| M2PG | main memory 106 | CPU 102 | CPU read from GART space |
| M2I | main memory 106 | PCI bus 112 | PCI read |
| I2M | PCI bus 112 | main memory 106 | PCI write |
| M2GI | main memory 106 | AGP bus 114 | GCI read |
| GI2M | AGP bus 114 | main memory 106 | GCI write |
| M2GART | main memory 106 | AGP interface 230 | GART lookup for address translation |
| M2G | main memory 106 | AGP bus 114 | AGP read |
| G2M | AGP bus 114 | main memory 106 | AGP write |

Although concurrent transaction flow through the North bridge 104 boosts memory access efficiency, a problem may occur if read and write requests to the same memory address are pending. Specifically, if the memory controller 200 services the read request before the write request, the requesting device may receive data that is about to be modified by the subsequent write request. This is a critical coherency issue for the memory controller 200, because it is usually desirable for a device to read the most current data, or the updated values (known as "clean" data), from main memory 106. Accordingly, a read request with an address matching a pending write address is known as a "dirty" read. To avoid "dirty" read transactions, the P2M queue 250 and G2M queue 270 transmit content addressable memory hit (CAM hit) signals to the memory controller 200, which are described in greater detail with respect to FIG. 3A.

The P2M queue 250, I2MQ 260, and G2M queue 270 compare the address of pending write requests stored in the queues with pending read requests. If a read request address matches a write request address, a CAM hit signal is generated. The CAM hit signal from the write queue 250, 260, or 270 notifies the memory controller 200 that the address of a pending read request matches the address of one or more pending write requests held in that write queue. In response to the CAM hit signal, the memory controller 200 services the write requests in the write queue 250, 260, or 270. The CAM hit signal remains asserted until all write requests causing a CAM hit are serviced or "flushed" from the write queue.

Figure 3A:
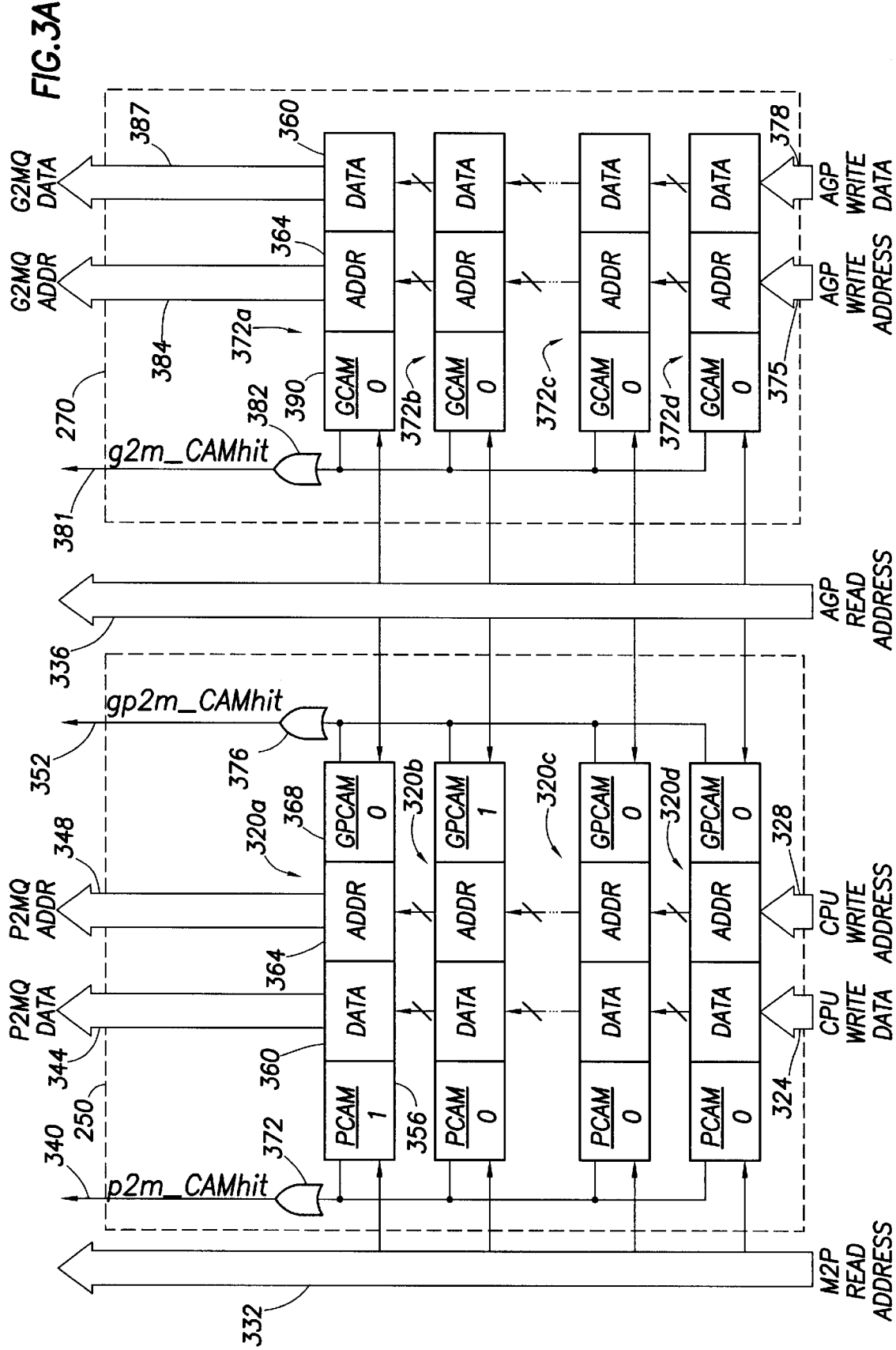
FIG. 3A is a block diagram of an exemplary embodiment of the write queues of FIG. 2.

Referring now to FIG. 3A, any queue supporting CAM hit signals can be generally constructed using one or more OR gates driven by a plurality of cascaded queue stages, with each stage containing a data register, an address register, and one or more CAM hit units. For instance, the P2M queue 250 includes a plurality of queue stages 320, each having data register 360, address register 364, P2M CAM hit (PCAM) unit 356, and GP2M CAM hit (GPCAM) unit 368. Although there may be any desired number of queue stages 320 in the P2M queue 250, only four such queue stages 320a, 320b, 320c, and 320d are shown in FIG. 3A. The remaining queue stages 320 are omitted from FIG. 3A as largely duplicative of the following description. The data and address registers of each stage 320 hold P2M queue 250 write data and P2M queue 250 write addresses, respectively, and couple to the corresponding data and address registers of the preceding and following stages 320 in a first-in, first-out (FIFO) configuration. Thus, each queue stage 320 is adapted to shift its data and address contents to the following queue 320 in response to the proper control signals (not shown). Further, the first stage 320d of the P2M queue 250 receives CPU-to-memory data and addresses from the CPU interface 210, while the final stage 320a of the P2M queue 250 passes the data and addresses to main memory 106. Each CAM hit unit receives input signals from an address register and a read address bus and drives one input of an OR gate. The OR gate determines the state of the CAM hit signal. The CAM hit unit essentially operates as a comparator, determining whether the contents of the address register match the address on the address bus. The CAM hit unit generates a logic "1" output signal if a match occurs or a logic "0" output signal if no match occurs. The CAM hit output signals feed an OR gate which generates the CAM hit signal, such that if one or more CAM hit unit generates a logic "1" output, then the OR gate will also generate a logic "1" output. Each type of CAM hit unit feeds a distinct OR gate. For instance, the P2M CAM hit (PCAM) units 356 feed a first OR gate 372, while the GP2M CAM hit (GPCAM) units 368 feed a second OR gate 376.

Accordingly, each PCAM unit 356 couples to a corresponding address register 320 and to the M2P read address bus 332. In FIG. 3A, the PCAM unit 356 of the final queue stage 320a has a logic "1" output, indicating that the address of a pending memory-to-CPU (M2P) read request on the M2P read address bus 332 matches the CPU-to-memory (P2M) write address in the address register 364 of the final queue stage 320a. Thus, OR gate 372 asserts the p2m__CAMhit signal, causing the memory controller 200 to process P2M write requests before processing the M2P read request. When the P2M write request held in the final queue stage 320a is processed and dequeued, the p2m__CAMhit signal becomes deasserted, allowing the memory controller 200 to process the pending M2P read request.

Similarly, each queue stage 320 of P2M queue 250 includes a GP2M CAM hit (GPCAM) unit 368 for indicating whether any P2M queue 250 write address matches a pending memory-to-AGP (M2G) read request address. Each GPCAM unit 368 receives input from an address register 364 and from the AGP read address bus 336. If the write address in the address register 364 matches the APG read address, then the GPCAM unit 368 generates a "1" output. Otherwise, the GPCAM unit 368 generates a "0" output. The output of each GPCAM unit 368 feeds OR gate 376, which asserts the CAM hit signal gp2m__CAMhit if at least one of the GPCAM units 368 has a "1" output. In FIG. 3A, the GPCAM unit 368 of the next-to-last queue stage 320b has a "1" output, indicating that the contents of the corresponding address register 364 match the contents of the AGP read address bus 336. Thus, OR gate 376 to asserts the gp2m__CAMhit signal, preventing the memory controller 200 from processing the pending M2G read request until the first two P2M write requests are processed and dequeued.

The G2M queue 270 generally comprises a plurality of cascaded queue stages 372, each containing an address register 364 and a data register 360 which hold addresses and data, respectively, for AGP-to-memory (G2M) write requests. Although there may be any desired number of queue stages 372, only four such queue stages 372a, 372b, 372c, and 372d are shown in FIG. 3A. The remaining queue stages 372 are omitted from FIG. 3A as largely duplicative of the following description. Similarly to the P2M queue 250, the first queue stage 372d of the G2M queue 270 receives data and addresses from the AGP interface 230, and the final queue stage 372a passes data and addresses to main memory 106. In contrast with the P2M queue 250, each queue stage 372 supports only one CAM hit function via the G2M CAM hit (GCAM) unit 390. Each GCAM unit 390 receives input from an address register 364 and from the AGP read address bus 336, generating an output signal according to whether or not the contents of the address register 364 match the M2G read address on the AGP read address bus 336. Accordingly, a GCAM unit 390 generates a logic "1" output if it detects an address match or a "0" output otherwise. Each GCAM 390 output feeds OR gate 382, which asserts the g2m__CAMhit signal if at least one output of a GCAM unit 390 is a logic "1." Thus, if at least one of the GCAM units 390 detects an address match, then the g2m__CAMhit signal is asserted, preventing the memory controller 200 from processing the pending M2G read request until all of the G2M write requests in the G2M queue 270 with addresses matching the M2G read request are processed and dequeued. In FIG. 3A, all GCAM units 390 are generating logic "0" outputs, indicating that the address register 364 contents of the G2M queue 270 do not currently match the contents of the AGP read address bus 336. Therefore, the g2m__CAMhit signal is not asserted in the example of FIG. 3A.

Referring now to FIGS. 2 and 3A, the implementation of the CAM hit signal is described in more detail in the following example of a CAM hit signal generated by the P2M queue 250. To request a memory-to-CPU read (M2P), the CPU must submit the memory address of that read request to the memory controller 200. The P2M queue 250, which holds pending CPU-to-memory write (P2M) requests, compares the addresses of all pending P2M requests with the read request address. If any valid write addresses held in the P2M queue 250 match the read request address, the P2M queue 250 asserts a p2m__CAMhit signal on line 340 to the memory controller 200. Upon receiving the p2m__CAMhit signal on line 340, the memory controller 200 stops servicing CPU-to-memory read requests and services CPU write requests until the pending CPU write transaction(s) that caused the assertion of the p2m__CAMhit are completed and dequeued (i.e., removed from the queue 250). When the address of the CPU read request no longer matches the address of any CPU write request, the p2m__CAMhit signal is deasserted, and the memory controller 200 may service CPU read requests.

In addition to monitoring CPU read requests, the P2M queue 250 also tracks memory-to-AGP (M2G) read requests. If the P2M queue 250 detects a pending AGP read transaction with an address matching any valid address within the P2M queue 250, the P2M queue 250 asserts gp2m__CAMhit 352 to the memory controller 200. The memory controller 200 then stops servicing AGP read requests but continues servicing CPU-to-memory (P2M) write requests until the P2M write requests causing the gp2m__CAMhit 352 are completed and dequeued. The gp2m__CAMhit 352 is then deasserted, and the memory controller continues to service AGP read requests.

Still referring to FIGS. 2 and 3A, the G2M queue 270 asserts an g2m__CAMhit signal 381 when an AGP read request matches any AGP-to-memory (G2M) write request held in the G2M queue 270. Operating in substantially the same manner as does the P2M queue 250, the G2M queue 270 continues to assert the g2m__CAMhit signal 381 until the AGP write requests are serviced which have addresses that match the pending AGP read request. Accordingly, the memory controller 200 stops servicing AGP read requests until the G2M queue 270 deasserts the g2m__CAMhit 381.

Figure 3B:
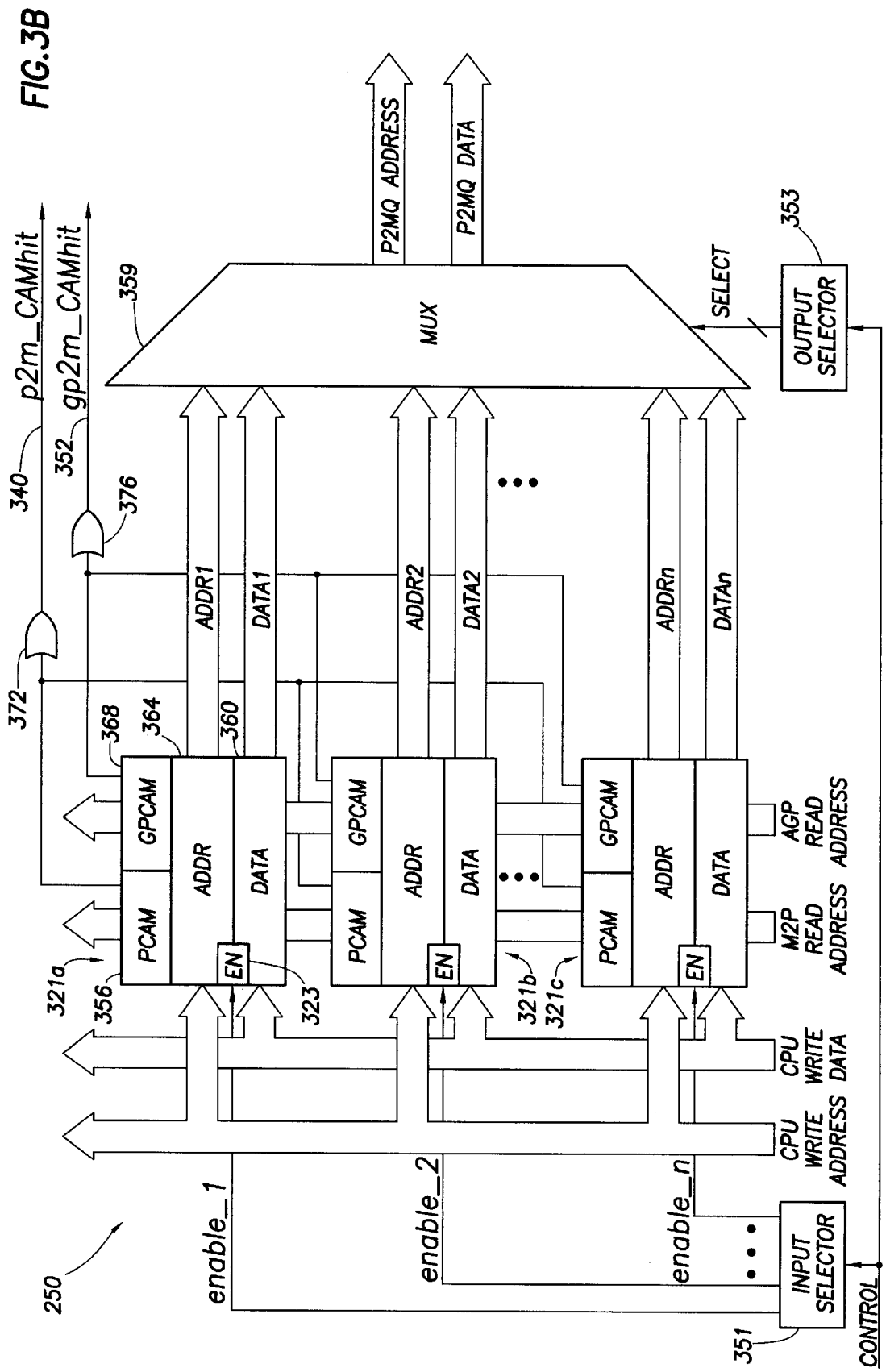
FIG. 3B is a block diagram of the preferred embodiment of the CPU-to-memory write queue of FIG. 2.

FIG. 3B illustrates the preferred embodiment of CPU-to-memory queue 250, which is adapted to operate as a first-in-first-out (FIFO) queue and includes a plurality of queue storage elements 321, an input selector 351, a multiplexer (mux) 359, an output selector 353, and OR gates 372 and 376. Each storage element 321 comprises a data register 360, an address register 364, P2M CAM hit (PCAM) unit 356, GP2M CAM hit (GPCAM) unit 368, and enable pin 323. Although there may be any desired number of storage elements 321 in the P2M queue 250, only three such storage elements 321a, 321b, and 321c are shown in FIG. 3B. The remaining storage elements 321 are omitted from FIG. 3B as largely duplicative of the following description. The data and address registers of each storage element 321 hold P2M queue 250 write data and P2M queue 250 write addresses, respectively, which are received from the CPU interface 210. The input selector 351 asserts an enable signal to the enable pin 323 of each queue to allow the data and address registers 360 and 364 of the selected storage element 321 to capture and hold the data and address for a CPU write cycle. The data and address registers 360 and 364 send DATA and ADDR signals to the mux 359. The output selector 353 provides select signals to control the output of the mux 353. The mux 359 also sends the data and address of each CPU-to-memory request to the memory controller 200. The data and address output by the mux 353 is selected from one of the DATA and ADDR input signals, based on the value of the select signals asserted by the output selector 353. The control logic 242 provides control signals to the input and output selectors 351 and 353 that determine the values of the enable and select signals, respectively.

When a memory write request is submitted to the CPU-to-memory queue 250, the value of the control signals causes the input selector 351 to assert an enable signal to one of the storage elements 321. Upon receiving the enable signal through enable pin 323, that storage element 321 captures and holds the address of the write request into its address register 364 and captures and holds the write request data into its data register 360. As the CPU-to-memory queue 250 receives subsequent write requests, the data and address for each request is placed in a different storage element 321 by asserting the associated enable signal. The select signals are asserted by the output selector 353 and determine which input signals the mux 359 will output to the memory controller 200. Hence, the CPU-to-memory queue 250 can submit any pending memory request from one of the storage elements 321 to the memory controller 200 by using the mux 353 to select the DATA and ADDR signals from that storage element 321. To operate the CPU-to-memory queue 250 as a FIFO queue, the output selector 353 selects the address and data from the queue which least recently captured the address and data from the CPU interface 210. When the data and address values are read from a storage element 321 by the memory controller 200, that storage element 321 is considered empty and may receive data and addresses for subsequent write transactions.

Each storage element 321 of the P2M queue 250 includes a P2M CAM hit (PCAM) unit 368 for indicating whether any P2M queue 250 write address matches the address of a pending memory-to-CPU (M2P) read request. The PCAM units 356 receive addresses of memory-to-CPU read requests from the CPU interface 210 and provide output signals to OR gate 372. The PCAM unit 356 in a given storage element 321 functions essentially as a comparator, determining if the address held in the address register 364 of that storage element 321 matches the address of the CPU read request. The PCAM units 356 assert a logic "1" output signal to OR gate 372 if the address of the CPU read request does not match the contents of the address register 364 or a logic "0" output signal if the address of the CPU read request matches the contents of the address register 364. Accordingly, OR gate 372 asserts the p2m_CAMhit signal if at least one of the CPU-to-memory write addresses in an address register 364 matches the memory-to-CPU read address.

Similarly, each storage element 321 of the P2M queue 250 includes a GP2M CAM hit (GPCAM) unit 368 for indicating whether any P2M queue 250 write address matches a pending memory-to-AGP (M2G) read request address. In a given storage element 321, the GPCAM unit 368 functions essentially as a comparator, comparing the contents of the address register 364 in that storage element 321 to the address on the AGP read address bus 336. The GPCAM units 368 receive addresses memory-to-AGP read requests from the AGP interface 230 and provide output signals to the OR gate 376. The GPCAM unit 368 in a given storage element 321 compares the address held in the address register 364 of that storage element 321 to the address of the AGP read request, asserting a logic "1" value to the OR gate 376 if the address of the AGP read request matches the contents of the address register 364. Accordingly, the OR gate 376 asserts the gp2m_CAMhit signal if at least one of the AGP-to-memory write addresses in an address register 364 matches the memory-to-AGP read address.

FIG. 3C illustrates the preferred embodiment of AGP-to-memory queue 270, which is adapted to operate as a first-in-first-out (FIFO) queue and includes a plurality of storage elements 371, an input selector 351, a multiplexer (mux) 359, an output selector 353, and OR gate 382. Each storage element comprises a data register 360, an address register 364, G2M CAM hit (GCAM) unit 390, and enable pin 323. Although there may be any desired number of storage elements 321 in the AGP queue 270, only three such storage elements 371a, 371b, and 371c are shown in FIG. 3C. The remaining storage elements 371 are omitted from FIG. 3C as largely duplicative of the following description. The data and address registers of each stage 371 hold AGP queue 270 write data and AGP queue 270 write addresses, respectively, which are received from the AGP interface 230. The input selector 351 asserts an enable signal to the enable pin 323 of each queue to allow the data and address registers 360 and 364 of the selected queue 371 to capture and hold the data and address for an AGP write cycle. The data and address registers 360 and 364 send DATA and ADDR signals to the mux 359. The output selector 353 provides select signals to control the output of the mux 359. The mux 359 also sends the data and address of each CPU-to-memory request to the memory controller 200. The data and address output by the mux 359 is selected from one of the DATA and ADDR input signals, based on the value of the select signals asserted by the output selector 353. The control logic 242 provides control signals to the input and output selectors 351 and 353 that determine the values of the enable and select signals, respectively.

When a memory write request is submitted to the AGP-to-memory queue 270, the value of the control signals causes the input selector 351 to assert an enable signal to one of the storage elements 371. Upon receiving the enable signal through enable pin 323, that storage element 371 captures and holds the address of the write request into its address register 364 and captures and holds the write request data into its data register 360. As the AGP-to-memory queue 270 receives subsequent write requests, the data and address for each request is placed in a different storage element 371 by asserting the associated enable signal. The select signals are asserted by the output selector 353 and determine which input signals the mux 359 will output to the memory controller 200. Hence, the AGP-to-memory queue 270 can submit any pending memory request from one of the storage elements 371 to the memory controller 200 by using the mux 353 to select the DATA and ADDR signals from that storage element 371. To operate the AGP-to-memory queue 270 as a FIFO queue, the output selector 353 selects the address and data from the queue which least recently captured the address and data from the CPU interface 210. When the data and address values are read from a storage element 371 by the memory controller 200, that storage element 371 is considered empty and may receive data and addresses for subsequent write transactions.

Each storage element 371 of the G2M queue 270 includes a G2M CAM hit (GCAM) unit 390 for indicating whether any G2M queue 270 write address matches a pending memory-to-AGP (M2G) read request address. In a given storage element 371, the GCAM unit 390 functions essentially as a comparator, determining if the contents of the address register 364 in that storage element 371 match the address on the AGP read address bus 336. The GCAM units 390 receive addresses of memory-to-AGP read requests from the AGP interface 230 and provide output signals to OR gate 382. The GCAM unit 390 in a given storage element 371 compares the address held in the address register 364 of that storage element 371 to the address of the AGP read request, asserting a logic "1" value to OR gate 382 if the address of the AGP read request matches the contents of the address register 364. Accordingly, OR gate 382 asserts the g2m__CAMhit signal if at least one of the AGP-to-memory write addresses in an address register 364 matches the memory-to-AGP read address.

Another embodiment of the invention could comprise any number of additional, or optional CAM hit signals. For instance, the I2M queue 260 could assert an I2M CAM hit signal to indicate that a pending PCI read address matches a pending I2M queue 260 write request address. In fact, any of the queues 250, 260, and 270 could provide CAM hit signals to indicate pending "dirty read" requests from any of the interfaces 210, 220, and 230. For example, the P2M queue 250 could provide an additional IP2M CAM hit, indicating that a PCI read request address matches a pending write address held in the P2M queue 250. Other CAM hit combinations are available as well and are listed with the aforementioned CAM hit signals in Table II, below. These alternative CAM hit signals may be provided by CAM hit units similar to PCAM unit 356, GPCAM unit 368, and GCAM unit 390, or through any other desired circuitry.

TABLE II

CAM hit summary.

| CAM hit | Asserted by | Triggered when | Released when |
|---|---|---|---|
| p2m__CAM hit | P2M queue 250 | CPU read address matches a P2M queue address | P2M queue requests that match CPU read address are serviced |
| gp2m__CAM hit | P2M queue 250 | AGP read address matches a P2M queue address | P2M queue requests that match AGP read address are serviced |
| g2m__CAM hit | G2M queue 270 | AGP read address matches a G2M queue address | G2M queue requests that match AGP read address are serviced |
| IP2M CAM hit | P2M queue 250 | PCI read address matches a P2M queue address | P2M queue requests that match PCI read address are serviced |
| IG2M CAM hit | G2M queue 270 | PCI read address matches a G2M queue address | G2M queue requests that match PCI read address are serviced |
| PG2M CAM hit | G2M queue 270 | CPU read address matches a G2M queue address | G2M queue requests that match CPU read address are serviced |
| I2M CAM hit | I2M queue 260 | PCI read address matches an I2M queue address | I2M queue requests that match PCI read address are serviced |
| PI2M CAM hit | I2M queue 260 | CPU read address matches an I2M queue address | I2M queue requests that match CPU read address are serviced |
| GI2M CAM hit | I2M queue 260 | AGP read address matches an I2M queue address | I2M queue requests that match AGP read address are serviced |

The first and second columns of Table II list the CAM hit signals and the queues that assert these signals, as described above. The third and fourth columns detail the conditions that trigger the CAM hit signals and allow the CAM hit signals to release.

It should be understood that although the memory write queues in the preferred embodiment submit requests to memory according to a first-in, first-out service scheme, the principles of the present invention apply to any type of service scheme, including a last-in, first-out scheme, a least-recently-used scheme, a round robin scheme, or any other desired scheme. Further, the principles of the present invention should not be construed as limited to devices that include memory request queues but may be incorporated into a system in which memory requests are submitted directly to a memory controller or other interface providing memory arbitration.

Figure 4:
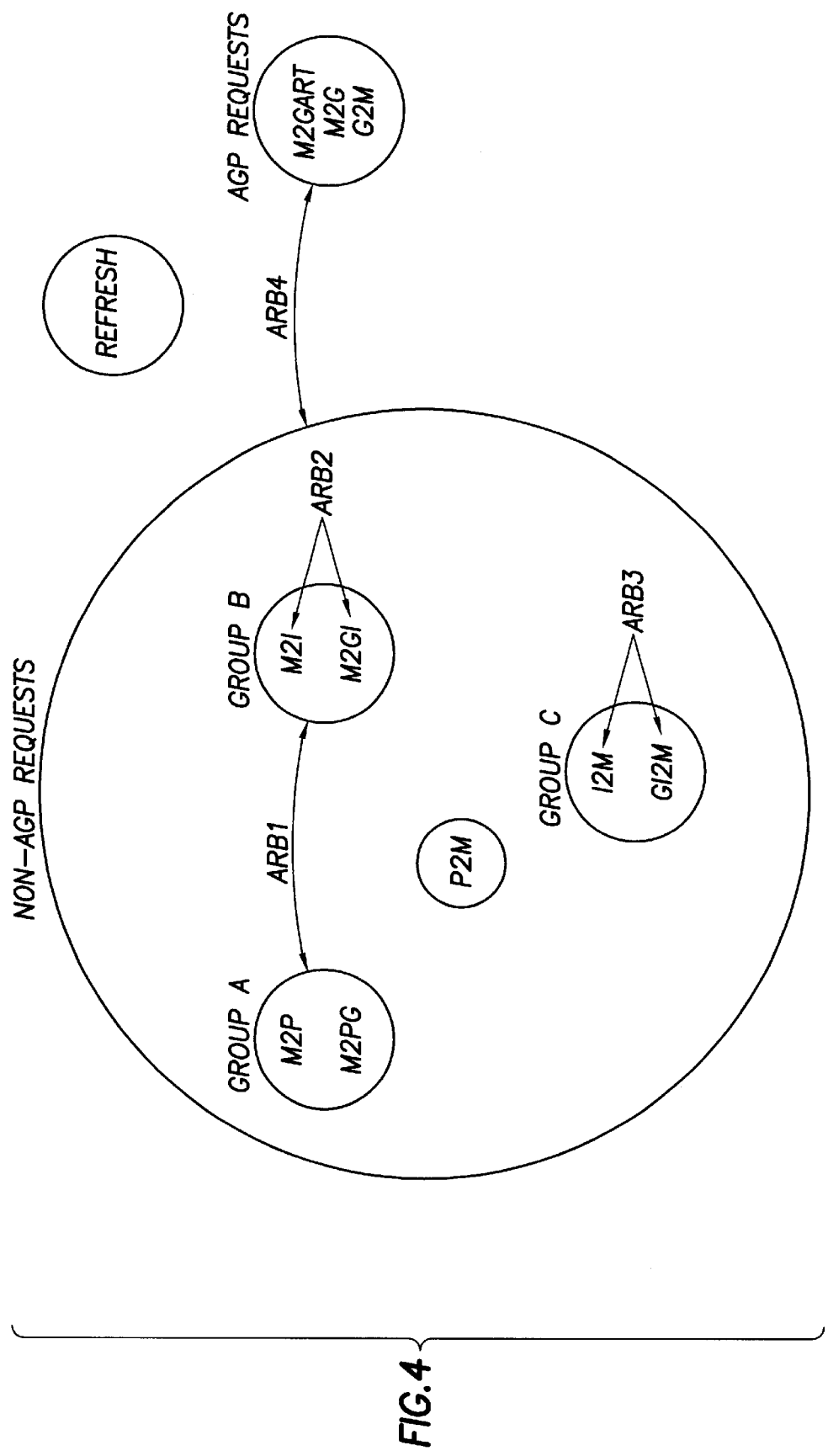
FIG. 4 is a diagram of an adaptive request priority structure used by the memory controller of FIG. 2, including four arbitration priority variables.
Figure 5:
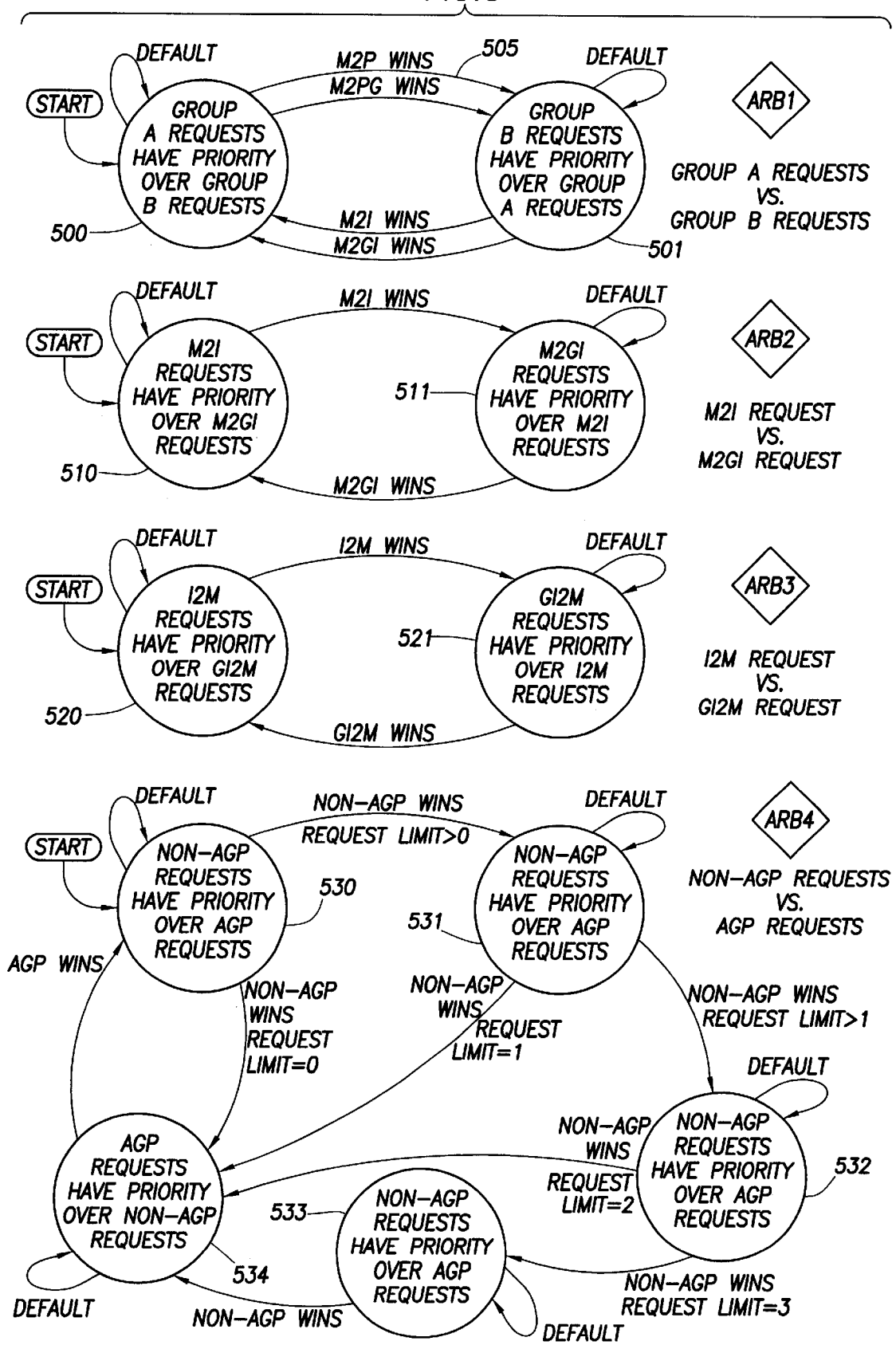
FIG. 5 is a state transition diagram of the arbitration priority variables of FIG. 4.

The memory controller 200 generally monitors the interfaces 210, 220, and 230 and the queues 250, 260, and 270 for pending memory requests. If more than one memory request is pending, the memory controller 200 arbitrates between the various requests, using a set of request priority rules to determine which request to acknowledge. In accordance with a preferred embodiment of the invention, the arbitration scheme used by the memory controller 200 may change periodically, based on which read and write transactions have been serviced previously. To implement this periodic change, the memory controller 200 preferably adapts the request priority rules during each cycle to favor the memory requests not serviced during that cycle. Thus, pending requests which initially have low arbitration priority may gradually increase in priority until they are serviced by the memory controller 200. Such an adaptive scheme can prevent a series of requests from one device from hoarding memory, inflicting memory "starvation" on the remaining lower-priority devices. The arbitration scheme of the preferred embodiment thus dynamically adjusts during each cycle to ensure that all devices have fair access to main memory 106. FIGS. 3B, 4, and 5 further explain the operation of the memory controller 200 and the adaptive arbitration scheme.

Figure 3D:
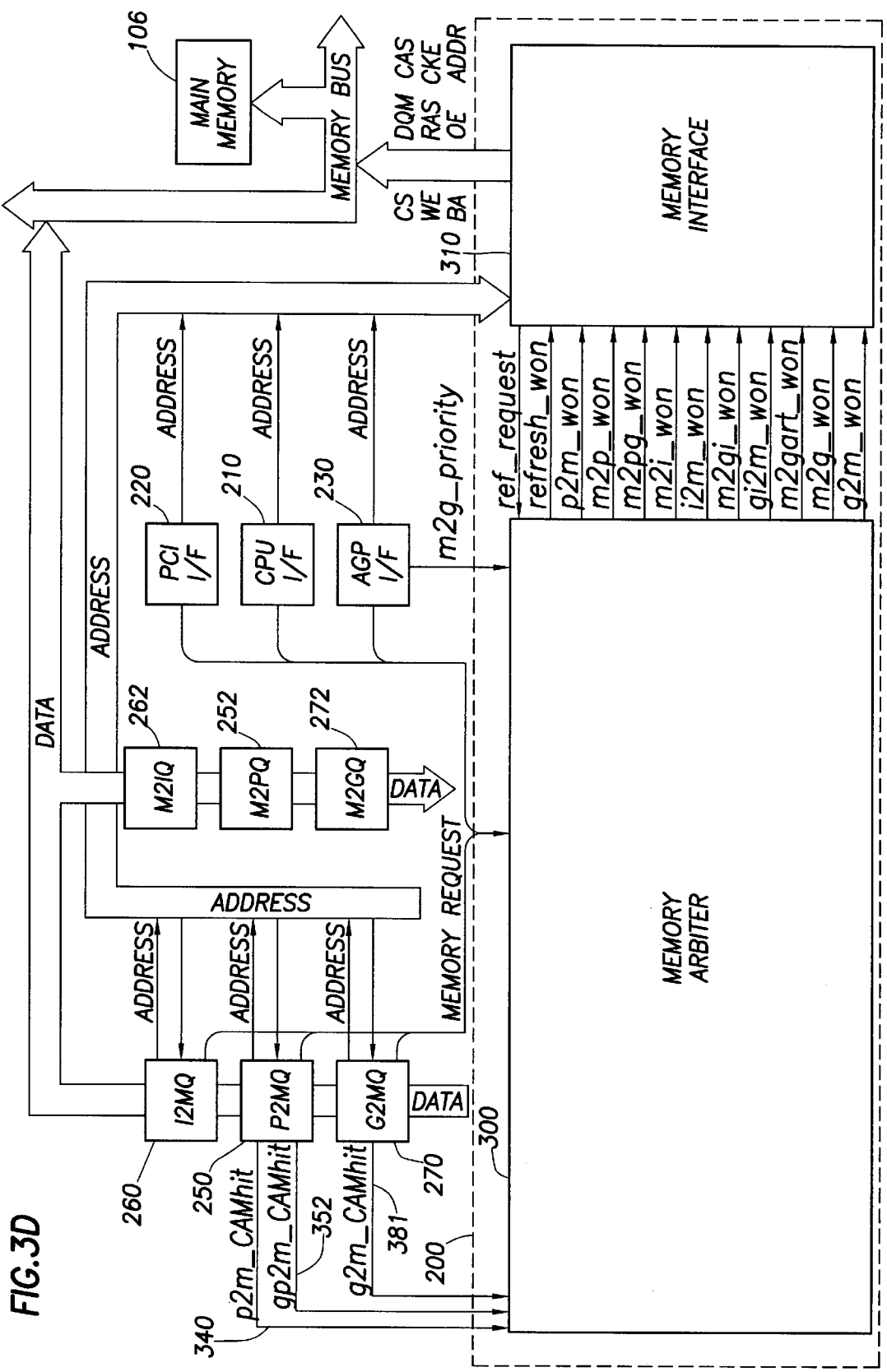
FIG. 3D is a block diagram of an exemplary embodiment of the memory controller of FIG. 2.

FIG. 3D illustrates an exemplary block diagram of the memory controller 200. The memory controller 200 generally comprises two blocks, the memory arbiter 300 and the memory interface 310. The memory arbiter 300 couples to the CPU interface 210, PCI interface 220, AGP interface 230, CPU-to-memory queue (P2MQ) 250, PCI-to-memory queue (I2MQ) 260, and AGP-to-memory queue (G2MQ) 270 via memory request lines. The memory arbiter 300 also couples to the P2M queue 250 and the G2M queue 270 via CAM hit signals p2m_CAMhit 340, gp2m_CAMhit 352, and g2m_CAMhit 381. The memory arbiter 200 may also be configured to receive additional CAM hit signals if desired, in accordance with the principles discussed above. The AGP interface 230 additionally sends an m2g_priority signal to the memory arbiter 300. The memory arbiter 300 generates the arbitration indicator signals, refresh_won, p2m_won, m2p_won, m2p_won, m2i_won, i2m_won, m2gi_won, gi2m_won, m2gart_won, m2g_won, and g2m_won, collectively known as the "who-won" signals. The "who-won" signals allow the memory interface 310 to identify which memory request wins memory arbitration for a given cycle.

The memory interface 310 asserts a ref_request signal which is received by the memory arbiter 300, and sends memory control signals which include data mask (DQM), column address strobe (CAS), row address strobe (RAS), chip select (CS), clock enable (CKE), write enable (WE), bank address (BA), output enable (OE), and address (ADDR) signals to the main memory 106. The memory interface 310 receives address signals from the P2M queue 250, I2M queue 260, G2M queue 270, CPU interface 210, PCI interface 220, and AGP interface 230 which indicate the memory addresses of data to be written to main memory 106. Finally, the memory interface 310 handles the control signals (not shown) that interconnect the memory arbiter 300, the memory interface 310, main memory 106, the data queues 250, 252, 260, 262, 270, and 272, and the interfaces 210, 220, and 230. For a compete description of the handshaking and configuration signals, reference may be made to commonly assigned co-pending application entitled "Computer System with Memory Controller and Bridge Interface Permitting Concurrent Operation." Although preferably incorporated externally of the memory controller 200, FIG. 3D illustrates data signals coupling the queues 250, 252, 260, 262, 270, and 272 to help explain the memory request transactions discussed below.

Request signals sent to the memory arbiter 300 by interfaces 210, 220, and 230 and by queues 250, 260, and 270 indicate that the originator of the request signal needs access to memory. The m2h_priority signal sent from the AGP interface 230 indicates whether an M2G request has high or low priority. Further, the memory interface 310 asserts a ref_request signal to indicate that memory needs to be refreshed, a standard process that computer memory must undergo regularly at standard, fixed time intervals to prevent loss of data. While the standard protocols necessary for accessing and refreshing main memory 106 are known to persons with ordinary skill in the art, the memory interface 310 preferably asserts a refresh request approximately every 15.6 μs via the ref_request signal. Thus, the request signals, along with the ref_request and m2g_priority signals, indicate to the memory arbiter 300 which types of memory accesses have been requested and are pending execution.

In addition, p2m_CAMhit 340 (generated by the P2M queue 250), gp2m_CAMhit 352 (generated by the P2M queue 250), and g2m_CAMhit 381 (generated by the G2M queue 270) indicate that the address of one of the write requests in the originating queue matches the address of a pending read request, as explained above. Specifically, a p2m_CAMhit 340 indicates that the address of a pending M2P request matches the address of a pending P2M request. Likewise, a gp2m_CAMhit 352 indicates that the address of a pending M2G request matches the address of a pending P2M request, while a g2m_CAMhit 381 indicates that the address of a pending M2G request matches the address of a pending G2M request. These CAM hit signals allow the memory arbiter 300 to adaptively modify the arbitration structure to prevent "dirty" read transactions, as described previously.

Based on the request, ref_request, m2g_priority, and CAM hit signals, the memory arbiter 300 uses a request priority structure to determine which request should win memory arbitration. The memory arbiter 300 identifies the winning request during a given arbitration cycle by asserting the associated "who-won" signal. These "who-won" signals indicate that either: (i) the refresh request won arbitration (refresh_won), (ii) the P2M request won arbitration (p2m_won), (iii) the M2P request won arbitration (m2p_won), (iv) the M2PG request won arbitration (m2p_won), (v) the M2 1 request won arbitration (m2_won), (vi) the I2M request won arbitration (i2m_won), (vii) the M2GI request won arbitration (m2g_won), (viii) the GI2M request won arbitration (gi2m_won), (ix) the M2GART request won arbitration (m2gart_won), (x) the G2M request won arbitration (g2m_won), or (xi) the M2G request won arbitration (m2g_won).

The memory arbiter 300 alternatively could use different schemes to indicate the arbitration winner to the memory interface 310. For example, the winning memory request could be encoded in signals transmitted between the memory arbiter and memory interface. With eleven possible "who_won" signals, four bits would suffice to encode the winning request, as will be apparent to one skilled in the art. Alternatively, one signal could encode the winning request by using a multiplexed signal or group of signals between the memory arbiter 300 and the memory interface 310.

Based on the winner of the arbitration cycle as indicated by a "who-won" signal, the memory interface 310 completes the winning transaction request with main memory 106. First, the memory interface 310 reads the memory address from the proper queue 250, 260, or 270 (for a write request) or from the appropriate interface 250, 260, or 270 (for a read request). Next, the memory interface 310 asserts the memory bus signals (DQM, CAS, RAS, CS, CKE, WE, BA, OE, and ADDR) in the standard sequence to encode the memory address for main memory 106. For a write transaction, the memory interface 310 notifies the appropriate queue 250, 260, or 270 through handshaking signals (not shown) to transfer the write data to main memory 106 via the data lines. Likewise, the memory interface 310 notifies the appropriate queue 252, 262, or 272 through handshaking signals (not shown) to receive read data from main memory 106 via the data lines.

As previously described, the memory controller 300 determines, through the request and ref_request signals, which types of memory requests are pending. The memory controller 300 uses these signals along with the CAM hit signals to determine which request to service during the next memory cycle. If only one type of memory request is pending, the memory controller 200 services those requests in the order requested. If there are multiple requests, however, the memory arbiter 300 must prioritize the pending requests in an efficient manner. Most importantly, the priority structure must regularly adapt to insure that no pending memory request gets ignored or unacceptably delayed.

To establish the priority structure, the memory arbiter 300 constantly monitors the present and previous memory-cycle requests, periodically modifying the request priority in favor of the least recently serviced requests. In this way, the memory arbiter 300 adapts the priority structure to favor the devices with memory requests not recently serviced by the memory controller 200. Thus, a memory request which loses arbitration during a particular memory cycle has a better chance of winning arbitration during the subsequent cycle. Furthermore, this scheme assures that the memory controller 200 will not inflict memory "starvation" on any memory requestor. Since no device is permitted to hoard main memory 106, all of the devices in the computer system 100 may complete timely memory transactions.

In accordance with a preferred embodiment of the invention, the memory arbiter 300 uses an adaptive arbitration algorithm to optimize the service request order for the memory controller 200. The arbitration method is based on a request-grouping system. Referring now to FIG. 4, the memory requests are grouped into AGP requests (M2GART, M2G, and G2M), non-AGP requests (M2P, M2PG, P2M, M2I, M2GI, I2M, and GI2M), and the refresh request. The non-AGP request group consists of the P2M request and three subgroups: Group A (M2P, M2PG), Group B (M2I, M2GI), and Group C (I2M, GI2M).

As illustrated in FIG. 4, the memory arbiter 300 uses four adaptive, binary-valued arbitration variables, Arb1, Arb2, Arb3, and Arb4, to establish priority rankings between and within the aforementioned groups. Specifically, the variable value sets a relative priority either between two groups or between two requests. For instance, the value of Arb1 determines whether Group A or Group B requests have higher priority. The value of Arb2 determines the relative priority among Group B requests (M2I and M2GI). The value of Arb3 determines the priority within Group C (I2M and GI2M), and the value of Arb4 ranks the priority of AGP requests versus the non-AGP requests. The initial states of Arb1, Arb2, Arb3, and Arb4, define the priority structure when the computer system 100 is initialized. These initial states preferably assign higher priority to Group A requests (Arb1), M2I requests (Arb2), I2M requests (Arb3), and non-AGP requests (Arb4). The memory arbiter 300 may change the values of the arbitration variables periodically, as discussed below with respect to FIG. 5, to alter the overall request priority structure. Table III summarizes these arbitration variable definitions.

TABLE III

Arbitration Variable definitions.

| Variable | Sets Priority Between | | Initial High Priority |
|---|---|---|---|
| Arb1 | Group A (M2P, M2PG) | Group B (M2I, M2GI) | Group A |
| Arb2 | M2I | M2GI | M2I |
| Arb3 | I2M | GI2M | I2M |
| Arb4 | AGP requests (M2GART, M2G, G2M) | non-AGP requests (M2P, P2M, M2PG, M2I, M2GI, I2M) | non-AGP requests |

In addition to the adaptive group rankings, the preferred embodiment defines the following set of priority rules:

(1) Refresh requests have priority over all other requests.
(2) M2P requests have higher priority than P2M requests.
(3) M2P and M2PG requests cannot be asserted concurrently.
(4) P2M requests have priority over M2PG, Group B, and Group C requests.
(5) Group B requests have higher priority than Group C requests.
(6) M2GART requests have priority over M2G and G2M requests.
(7) M2G requests have priority over G2M requests.

Rule (1) serves to prevent data loss in main memory 106. Refresh requests typically comprise a small percentage of the memory requests and take comparatively little time to complete. Therefore, refresh requests should never inflict memory starvation in the other devices, even though refresh requests are granted a constant, first priority.

Rules (2), (5), (6), and (7) essentially set read transaction priorities above those of write transactions, since a device that needs data from main memory 106 must usually read that data before it can resume operation. Unless a "dirty" read request is pending, a memory write operation can usually sustain a short delay without affecting system performance. Therefore, M2P (CPU read) requests have priority over P2M (CPU write) requests, Group B (PCI and GCI read) requests have higher priority than Group C (PCI and GCI write) requests, and M2G and M2GART (AGP read) requests have priority over G2M (AGP write) requests.

As for rule (3), the CPU cannot issue M2P requests and M2PG concurrently since these two requests are issued through the same address and handshaking signals. Hence, no priority relationship need be defined between M2P and M2PG requests.

Rule (4) is an exception to the general guideline that read requests have priority over write requests, since the P2M (CPU write) request has higher priority than the M2PG (CPU read) request. This exception is a key example of the ability of the present invention to combine adaptive arbitration rules with a predetermined, fixed arbitration structure, allowing the computer designer maximum control over the arbitration scheme.

From rule (1), it follows that the refresh request always wins memory arbitration. If no refresh request is pending, however, the memory arbiter 300 chooses a winning memory request by determining which pending requests belong to the highest-priority group (as defined by Arb1, Arb2, Arb3, and Arb4) and granting the highest-priority request within that highest-priority group. If no requests are pending from the highest-priority group, the memory arbiter 300 chooses a request from the highest-priority group that has a pending request. Consequently, if only one request is pending, the memory arbiter 300 will choose that one request for memory access regardless of the priority of the group which comprises that request. Based on which request is chosen as the winning request, the memory arbiter 300 may re assign the values of the adaptive arbitration variables, as discussed below with respect to FIG. 5.

Although the memory arbiter 300 may adapt the priority structure by changing the variable states periodically, the adaptive request priority structure is essentially determined for any given combination of the arbitration priority variables. Since the memory arbiter preferably uses four arbitration variables, each of which may equal one of two states, there are sixteen different combinations of arbitration variables and therefore sixteen basic priority structures. Each of the sixteen combinations establishes an explicit priority ranking of the request groups. For instance, if Arb1 gives priority to Group A requests, Arb2 gives priority to the M2I request, Arb3 gives priority to the I2M request, and Arb4 gives priority to non-AGP requests, then the general group request rank is: Group A (1st), Group B (2nd), Group C (3rd), and AGP (4th). Using priority rules (1) through (7), the exact priority among requests, listed from highest to lowest priority, becomes: Refresh, M2P, P2M, M2PG, M2I, M2GI, I2M, GI2M, M2GART, M2G, and G2M.

Thus, the basic request priority structure may be determined for any given combination of arbitration variable states. Table IV, below, details the sixteen basic possible priority structures, assuming no CAM hit signals are asserted (integration of the CAM hit signals into the priority structure will be explained in more detail with respect to Table V, below). Each row of Table IV consists of a single fixed priority structure (note that the previous example illustrates the initial priority structure, listed in the first row of Table IV). The first column, "Arbitration Variable Values," lists the values (or "states") of Arb1, Arb2, Arb3, and Arb4. These values describe which request or group of requests has higher priority. For instance, the two possible Arb1 states are "A" and "B." "Arb1=A" means that Group A requests have priority over Group B requests, while "Arb1=B" means that Group B requests have priority over Group A requests.

Similarly, "Arb2=M2I" means that M2I requests have priority over M2GI requests, while "Arb2=M2GI" means that M2GI requests have priority over M2I requests. Likewise, "Arb3=I2M" means that I2M requests have priority over GI2M requests, while "Arb3=GI2M" means that GI2M requests have priority over I2M requests. Finally, "Arb4=Non" means that non-AGP requests have priority over AGP requests, while "Arb4=AGP" means that AGP requests have priority over non-AGP requests. The remaining columns list the requests in order of priority, with the highest priority requests in the "#1" column. Note that "Ref." which stands for "Refresh" in Table IV, has first priority for all combinations of the arbitration variables.

Additional rules dictate that CAM hit signals may alter the normal priorities as follows:

(8) A p2m_CAMhit signal 340 assigns P2M requests priority over M2P requests.
(9) A gp2m_CAMhit signal 352 assigns P2M requests priority over M2G requests, regardless of the state of Arb4.
(10) A g2m_CAMhit signal 381 ranks G2M requests over low-priority M2G requests.

As described previously, CAM hit signals indicate a pending write request intended for a memory location from which another device is requesting data to read. For instance, the p2m_CAMhit signal 340 indicates that an M2P (read) request is intended for a memory location that is about to be written to by a pending P2M (write) request. Likewise, the gp2m_CAMhit signal 352 indicates that an M2G (read) request is intended for a memory location that is about to be written to by a pending P2M (write) request. Finally, the g2m_CAMhit signal 381 indicates that an M2G (read) request is intended for a memory location that is about to be written to by a pending G2M (write) request. The CAM hit signals alert the memory arbiter 300 to temporarily prioritize write requests above these "dirty" read requests until the pending write data can be transferred to memory.

For instance, a p2m_CAMhit signal 340 implies that P2M as well as M2P requests are pending which have matching addresses. If non-AGP requests have priority over AGP requests (Arb4), then the p2m_CAMhit signal 340 combined with rule (4), above, dictates that the P2M request has highest priority (assuming no pending refresh request) of all pending requests. If AGP requests have priority over non-AGP requests (Arb4), then the P2M request has highest priority (assuming no pending refresh request) only if no

TABLE IV

Request priorities based on arbitration priority variable combinations (no asserted CAM hit signals).

| Arbitration Variable Values | | #1 | #2 | #3 | #4 | #5 | #6 | #7 | #8 | #9 | #10 | #11 |
|---|---|---|---|---|---|---|---|---|---|---|---|---|
| Arb1 = A<br>Arb2 = M2I | Arb3 = I2M<br>Arb4 = Non | Ref | M2P | P2M | M2PG | M2I | M2GI | I2M | GI2M | M2GART | M2G | G2M |
| Arb1 = B<br>Arb2 = M2I | Arb3 = I2M<br>Arb4 = Non | Ref | P2M | M2I | M2GI | M2P | M2PG | I2M | GI2M | M2GART | M2G | G2M |
| Arb1 = A<br>Arb2 = M2GI | Arb3 = I2M<br>Arb4 = Non | Ref | M2P | P2M | M2PG | M2GI | M2I | I2M | GI2M | M2GART | M2G | G2M |
| Arb1 = B<br>Arb2 = M2GI | Arb3 = I2M<br>Arb4 = Non | Ref | P2M | M2GI | M2I | M2P | M2PG | I2M | GI2M | M2GART | M2G | G2M |
| Arb1 = A<br>Arb2 = M2I | Arb3 = GI2M<br>Arb4 = Non | Ref | M2P | P2M | M2PG | M2I | M2GI | GI2M | I2M | M2GART | M2G | G2M |
| Arb1 = B<br>Arb2 = M2I | Arb3 = GI2M<br>Arb4 = Non | Ref | P2M | M2I | M2GI | M2P | M2PG | GI2M | I2M | M2GART | M2G | G2M |
| Arb1 = A<br>Arb2 = M2GI | Arb3 = GI2M<br>Arb4 = Non | Ref | M2P | P2M | M2PG | M2GI | M2I | GI2M | I2M | M2GART | M2G | G2M |
| Arb1 = B<br>Arb2 = M2GI | Arb3 = GI2M<br>Arb4 = Non | Ref | P2M | M2GI | M2I | M2P | M2PG | GI2M | I2M | M2GART | M2G | G2M |
| Arb1 = A<br>Arb2 = M2I | Arb3 = I2M<br>Arb4 = AGP | Ref | M2GART | M2G | G2M | M2P | P2M | M2PG | M2I | M2GI | I2M | GI2M |
| Arb1 = B<br>Arb2 = M2I | Arb3 = I2M<br>Arb4 = AGP | Ref | M2GART | M2G | G2M | P2M | M2I | M2GI | M2P | M2PG | I2M | GI2M |
| Arb1 = A<br>Arb2 = M2GI | Arb3 = I2M<br>Arb4 = AGP | Ref | M2GART | M2G | G2M | M2P | P2M | M2PG | M2GI | M2I | I2M | GI2M |
| Arb1 = B<br>Arb2 = M2GI | Arb3 = I2M<br>Arb4 = AGP | Ref | M2GART | M2G | G2M | P2M | M2GI | M2I | M2P | M2PG | I2M | GI2M |
| Arb1 = A<br>Arb2 = M2I | Arb3 = GI2M<br>Arb4 = AGP | Ref | M2GART | M2G | G2M | M2P | P2M | M2PG | M2I | M2GI | GI2M | I2M |
| Arb1 = B<br>Arb2 = M2I | Arb3 = GI2M<br>Arb4 = AGP | Ref | M2GART | M2G | G2M | P2M | M2I | M2GI | M2P | M2PG | GI2M | I2M |
| Arb1 = A<br>Arb2 = M2GI | Arb3 = GI2M<br>Arb4 = AGP | Ref | M2GART | M2G | G2M | M2P | P2M | M2PG | M2GI | M2I | GI2M | I2M |
| Arb1 = B<br>Arb2 = M2GI | Arb3 = GI2M<br>Arb4 = AGP | Ref | M2GART | M2G | G2M | P2M | M2GI | M2I | M2P | M2PG | GI2M | I2M |

AGP requests are pending. Under no circumstance may the M2P request win memory arbitration before the "dirty" P2M data is dequeued (or "flushed") from the P2M queue 250 and the p2m_CAMhit 340 is deasserted.

Likewise, a gp2m_CAMhit signal 352 implies both pending P2M and M2G requests and must be deasserted before an M2G request may win memory arbitration. As explained previously, the gp2m_CAMhit 352 is deasserted only after all P2M requests with addresses matching the M2G address win memory arbitration and are flushed from the P2M queue 250. If the gp2m_CAMhit signal 352 is asserted and the M2G request is the highest-priority pending request (based on the arbitration variables and rules (1) through (7)), then the P2M request wins memory arbitration. If the "dirty" P2M write request is not about to be dequeued from the P2M queue 250 (i.e., other P2M requests must be dequeued before the "dirty" P2M request can be written), then P2M requests have priority over M2G requests until the "dirty" P2M request is written to memory and the gp2m_CAMhit signal 352 is deasserted.

The g2m_CAMhit signal 381 detects both pending low-priority M2G requests and G2M requests intended for the same memory address. Accordingly, the g2m_CAMhit 381 invokes suspension of rule (7) (that M2G requests have priority over G2M requests). Hence, no M2G request wins memory arbitration until the "dirty" G2M request is written to memory. When the "dirty" G2M request is dequeued and written to memory, the G2M queue deasserts the g2m_CAMhit 381, again giving M2G requests priority over G2M requests. A high-priority M2G request preferably does not trigger a CAM hit signal.

The arbitration rules, taking into account the CAM hit signals, may be clearly expressed in terms of logic equations in accordance with the preferred embodiment. Table V lists and defines the meanings of the input variables used in the logic equations which are provided below.

TABLE V

Definitions of input logic variables for memory arbitration.

| Variable | Definition |
| --- | --- |
| Ref | A refresh request is pending. |
| m2p | An M2P request is pending. |
| p2m | A P2M request is pending. |
| m2pg | A M2PG request is pending. |
| m2I | An M2I request is pending. |
| m2gi | An M2GI request is pending. |
| i2m | An I2M request is pending. |
| gi2m | A GI2M request is pending. |
| m2gart | An M2GART request is pending. |
| m2g | An M2G request is pending. |
| g2m | A G2M request is pending. |
| m2g_hp | The M2G request is a high-priority M2G request. |
| p2mcam | An M2P request is causing a CAM hit of the CPU to memory queue 250. |
| g2mcam | An M2G request is causing a CAM hit of the AGP to memory queue 270. |
| gp2mcam | An M2G request is causing a CAM hit of the CPU to memory queue 250. |
| Arb1 | Arb1 is in its initial state, conferring higher priority to Group A requests. |
| Arb2 | Arb2 is in its initial state, conferring higher priority to M2I requests. |
| Arb3 | Arb3 is in its initial state, conferring higher priority to I2M requests. |
| Arb4 | Arb4 is in its initial state, conferring higher priority to non-AGP requests. |

In the following expressions, the operator "NOT" signifies a logical inverse operation. For example, "NOT(m2i OR m2gi)" means that neither an M2I nor an M2GI request is pending. Likewise, "NOT p2mcam" means that no pending M2P request is causing a CAM hit to the CPU to memory queue 250. Finally, "NOT Arbn" means that Arbn (where n=1, 2, 3, or 4) is not in its initial state. As explained above, the initial arbitration states are: Group A has priority over Group B (Arb1), M2I has priority over M2GI (Arb2), I2M has priority over GI2M (Arb3), and non-AGP requests have priority over AGP requests (Arb4). The "NOT" operator inverts these priorities as follows: "NOT Arb1" signifies that Group B requests have priority over Group A requests, "NOT Arb2" means that M2GI requests have priority over M2I requests, "NOT Arb3" means that GI2M requests have priority over I2M requests, and "NOT Arb4" means that AGP requests have priority over non-AGP requests. Given these definitions, the following logic equations define the values of the "who-won" signals and thereby determine the arbitration winner in accordance with the preferred embodiment.

The refresh_won signal indicates that the refresh request won memory arbitration and is given by equation (1):

$$\text{refresh\_won} = \text{ref} \qquad (1)$$

The m2p_won signal indicates that the M2P request won memory arbitration and is given by equation (2):

m2p_won=NOT(ref) AND m2p AND NOT(p2mcam) AND (Arb1 OR (NOT(Arb1) AND NOT(m2i OR m2gi))) AND (Arb4 OR (NOT(Arb4) AND NOT(m2g AND NOT(gp2mcam)) AND (m2g_hp OR (NOT(m2g_hp) AND NOT(g2mcam))) OR g2m OR m2gart)))  (2)

The p2m_won signal indicates that the P2M request won memory arbitration and is given by equation (3):

p2m_won=NOT(ref) AND p2m AND

NOT(m2p AND NOT(p2mcam) AND (Arb1 OR (NOT(Arb1) AND NOT(m2i OR m2gi)))) AND (Arb4 OR (NOT(Arb4) AND NOT(m2g AND NOT(gp2mcam)) AND (m2g_bp OR (NOT(m2g_hp) AND NOT(g2mcam))) OR g2m OR m2gart)))  (3)

The m2pg_won signal indicates that the M2PG request won memory arbitration and is given by equation (4):

m2pg_won=NOT(ref) AND m2pg AND NOT(p2m) AND (Arb1 OR (NOT(Arb1) AND NOT(m2i OR m2gi))) AND (Arb4 OR (NOT(Arb4) AND NOT(m2g AND NOT(gp2mcam)) AND (m2g_hp OR (NOT(m2g_hp) AND NOT(g2mcam))) OR g2m OR m2gart)))  (4)

The m2i_won signal indicates that the M2I request won memory arbitration and is given by equation (5):

m2i_won=NOT(ref) AND m2i AND NOT(p2m) AND (NOT(Arb1) OR (Arb1 AND NOT((m2p AND NOT p2mcam) OR m2pg))) AND (Arb2 OR (NOT(Arb2) AND NOT m2gi)) AND (Arb4 OR (NOT(Arb4) AND NOT(m2g AND NOT(gp2mcam)) AND (m2g_hp OR (NOT(m2g_hp) AND NOT(g2mcam))) OR g2m
OR m2gart)))     (5)

The m2gi_won signal indicates that the M2GI request won memory arbitration and is given by equation (6):

m2gi_won=NOT(ref) AND m2gi AND NOT(p2m) AND (NOT(Arb1) OR (Arb1 AND NOT((m2p AND NOT p2mcam) OR m2pg))) AND (NOT(Arb2) OR (Arb2 AND NOT m2i)) AND (Arb4 OR (NOT(Arb4) AND NOT(m2g AND NOT(gp2mcam) AND (m2g_hp OR (NOT(m2g_hp) AND NOT(g2mcam))) OR g2m
OR m2gart)))     (6)

The i2m_won signal indicates that the I2M request won memory arbitration and is given by equation (7):

i2m_won=NOT(ref) AND i2m AND NOT(p2m) AND NOT(m2p AND NOT p2mcam) AND

NOT(m2pg) AND NOT(m2i) AND NOT(m2gi) AND (Arb3 OR (NOT(Arb3) AND gi2m)) AND (Arb4 OR (NOT(Arb4) AND NOT(m2g AND NOT(gp2mcam) AND (m2g_hp OR (NOT(m2g_hp) AND NOT(g2mcam))) OR g2m
OR m2gart)))     (7)

The gi2m_won signal indicates that the GI2M request won memory arbitration and is given by equation (8):

gi2m_won=NOT(ref) AND gi2m AND NOT(p2m) AND NOT(m2p AND NOT p2mcam) AND

NOT(m2pg) AND NOT(m2i) AND NOT(m2gi) AND (NOT(Arb3) OR (Arb3 AND NOT i2m)) AND (Arb4 OR (NOT(Arb4) AND NOT(m2g AND NOT(gp2mcam) AND (m2g_hp OR (NOT(m2g_hp) AND NOT(g2mcam))) OR g2m
OR m2gart)))     (8)

The m2gart_won signal indicates that the M2GART request won memory arbitration and is given by equation (9):

m2gart_won=NOT(ref) AND m2gart AND (NOT(Arb4) OR (Arb4 AND NOT((m2p AND NOT p2mcam) OR m2pg OR p2m OR m2i OR m2gi OR i2m OR gi2m)))     (9)

The m2g_won signal indicates that the M2G request won memory arbitration and is given by equation (10):

m2g_won=NOT(ref) AND m2g AND NOT(gp2mcam) AND (m2g_hp OR (NOT(m2g_hp) AND NOT g2mcam)) AND NOT(m2gart) AND (NOT(Arb4) OR (Arb4 AND NOT((m2p AND NOT p2mcam) OR m2pg OR p2m OR m2i OR m2gi OR i2m OR gi2m)))     (10)

The g2m_won signal indicates that the G2M request won memory arbitration and is given by equation (11):

g2m_won=NOT(ref) AND g2m AND NOT(m2gart) AND

NOT(m2g AND NOT(gp2mcam) AND (m2g_hp OR
(NOT(m2g_hp) AND NOT g2mcam))) AND (NOT(Arb4) OR (Arb4 AND NOT((m2p AND NOT p2mcam) OR m2pg OR p2m OR m2i OR
m2gi OR i2m OR gi2m)))     (11)

The memory arbiter 300 preferably evaluates equations (1) through (11) to determine the arbitration winner during any arbitration cycle, given the states of the adaptive arbitration variables Arb1, Arb2, Arb3, and Arb4. It should be understood, however, that other logic equations may be developed without departing from the principles of the present invention. The logic equations listed above do not disclose how the arbitration variables may be periodically adapted. Hence, FIG. 5 illustrates the state transitions of the arbitration variable. As mentioned previously, a preferred embodiment of the priority scheme penalizes requests which win memory arbitration by lowering the priority rating of those winning requests. This penalty is accomplished by toggling the states of one or more of the arbitration variables Arb1, Arb2, Arb3, and Arb4 associated with the group that comprises the winning memory request.

Referring now to FIG. 5 the adaptation procedure can be described using a state diagram. The state diagram for each arbitration variable begins at a start block which leads to one or more arbitration states. The label on the right-hand side of each transition diagram indicates the variable corresponding to that transition diagram. Thus, states 500 and 501 represent the state transition diagram for Arb1. Similarly, states 510 and 511 represent the state transition diagram for Arb2 and states 520 and 521 represent the state transition diagram for Arb3. States 530, 531, 532, 533, and 534 represent the state transition diagram for Arb4. As discussed above in relation to FIG. 4, the memory controller 200 changes the four arbitration variables concurrently and independently of each other, based on the current state of the variable immediately before the transition and on which request most recently won memory arbitration. Note, however, that the a state of a variable need not change every arbitration cycle, since the default transition from a particular state always leads back to the state itself.

Each state in the diagram represents a unique value held by one of the arbitration variables. At any given moment, each arbitration variable is associated with (or "occupies") one of these states. The state occupied by an arbitration variable at any given moment describes the priority value associated with that variable. For instance, Arb1 may occupy either state 500 or state 501. When Arb1 occupies state 500 (the initial state for Arb1), Group A requests (M2P, M2PG) have priority over Group B requests. When Arb1 occupies state 501, however, Group B (M2I, M2GI) requests have priority over Group A requests. The variables change states, or transition, whenever the conditions associated with the arrows are true. For example, the topmost transition arrow 505 between states 500 and 501 points from state 500 to state 501. According to the condition associated with the topmost transition arrow 505, Arb1 may change from state 500 to state 501 whenever an M2P request wins memory arbitration.

Referring to FIGS. 4 and 5, Arb1 further transitions as follows. Upon system startup (or "boot"), Arb1 begins in initial state 500. In initial state 500, both M2P and M2PG (Group A) requests are assigned priority over both M2I and M2GI (Group B) requests. If the memory arbiter 300 grants an M2P or M2PG request (based on the rules outlined above and illustrated in FIG. 5), Arb1 preferably transitions to state 501, where both M2I and M2GI (Group B) requests have priority over M2P and M2PG (Group A) requests. If no M2P or M2PG request is granted during a particular arbitration cycle while Arb1 occupies state 500, Arb1 follows the default path and remains in state 500. Thus, the memory arbiter 300 gives priority to Group B requests as soon as a Group A request is serviced.

In state 501, M2I and M2GI (Group B) requests are assigned priority over both M2P and M2PG (Group A) requests. If the memory arbiter 300 grants an M2I or M2GI request (based on the rules outlined above and illustrated in FIG. 5), Arb1 will return to state 500, where both M2P and M2PG (Group A) requests have priority over M2I and M2GI (Group B) requests. If no M2I or M2GI (Group B) request is granted during a particular arbitration cycle during state 501, Arb1 follows the default path and remains in state 501. Thus, the adaptable state of Arb1 ensures that a series of M2P or M2PG (Group A) requests can never "starve" a PCI or AGP device from executing M2I or M2GI (Group B) requests with main memory 106 and likewise that a series of M2I or M2GI (Group B) requests can never starve the CPU 102 from transacting M2P or M2PG (Group A) requests with main memory 106.

State transitions for Arb2 are similar to the transitions for Arb1. The Arb2 variable may occupy state 510, where M2I requests have priority over M2GI requests, or may occupy state 511, where M2GI requests have priority over M2I requests. The Arb2 variable begins in initial state 510. In initial state 510, M2I requests are assigned priority over M2GI requests. If the memory arbiter 300 grants an M2I request (based on the rules outlined above and illustrated in FIG. 5), Arb2 preferably transitions to state 511 , where M2GI requests have priority over M2I requests. If no M2I request is granted during a particular arbitration cycle, Arb2 follows the default path and remains in state 510. Thus, the memory arbiter 300 gives priority to M2GI requests as soon as an M2I request is serviced.

In state 511, M2GI requests are assigned priority over M2I requests. If the memory arbiter 300 grants an M2GI request (based on the rules outlined above and illustrated in FIG. 5), Arb2 will return to state 510, where both M2I requests have priority over M2GI requests. If no M2GI request is granted during a particular arbitration cycle during state 511, Arb2 follows the default path and remains in state 511. Thus, the adaptable state of Arb2 ensures that a series of M2I requests can never starve an AGP device from executing M2GI request with main memory 106 and likewise that a series of M2GI requests can never starve a PCI device from transacting M2I requests with main memory 106.

Similarly, Arb3 may occupy state 520, where I2M requests have priority over GI2M requests, or may occupy state 521, where GI2M requests have priority over I2M requests. The Arb3 variable begins in initial state 520. In initial state 520, I2M requests are assigned priority over GI2M requests. If the memory arbiter 300 grants an I2M request (based on the rules outlined above and illustrated in FIG. 5), Arb3 preferably transitions to state 521, where GI2M requests have priority over I2M requests. If no I2M request is granted during a particular arbitration cycle while Arb3 occupies state 520, Arb3 follows the default path and remains in state 520. Thus, the memory arbiter 300 gives priority to GI2M requests as soon as an I2M request is serviced.

In state 521, GI2M requests are assigned priority over I2M requests. If the memory arbiter 300 grants an GI2M request (based on the rules outlined above), Arb3 will return to state 520, where I2M requests have priority over GI2M requests. If no GI2M request is granted during a particular arbitration cycle during state 521, Arb3 follows the default path and remains in state 521. Thus, the adaptable state of Arb3 ensures that a series of I2M requests can never starve an AGP device from executing GI2M request with main memory 106 and likewise that a series of GI2M requests can never starve a PCI device from transacting I2M requests with main memory 106.

Finally, Arb4 may occupy state 534, where AGP requests have priority over non-AGP requests, or may occupy state 530, 531, 532, or 533, where non-AGP requests have priority over AGP requests. The state transitions for Arb4 are additionally determined by the Request Limit variable, which determines how many non-AGP requests are serviced before priority is given to AGP requests. The Arb4 variable has a transition path similar to those of Arb1, Arb2, and Arb3 in that Arb4 governs the relative priority between two sets of requests, AGP requests and non-AGP requests. However, the use of a Request Limit input variable increases the flexibility of the arbitration scheme for Arb4. Request Limit is preferably a programmable variable stored in control logic 242 and governs the number of additional non-AGP requests that the memory controller 200 can grant for every AGP request granted. For instance, if the Request Limit variable is set to zero, the memory arbiter 300 assigns higher priority to AGP requests every time the memory controller 200 grants a non-AGP request. If the Request Limit variable is set to one, however, the memory arbiter 300 assigns higher priority to AGP requests only after the memory controller 200 services two non-AGP requests consecutively. If the Request Limit variable equals two or three, the memory arbiter assigns higher priority to AGP requests only after the memory controller 200 services three or four consecutive non-AGP requests, accordingly. While Request Limit is preferably programmable and limited to the integers 0, 1, 2, and 3, alternative embodiments may include any desired set of integer values for Request Limit or may include a Request Limit variable that is not programmable.

The memory arbiter 300 preferably assigns higher priority to non-AGP requests every time the memory controller 200 services an AGP request, no matter how the Request Limit variable is set. Thus, multiple non-AGP requests may be serviced for every one AGP request.

Referring still to FIGS. 4 and 5, the transitions for Arb4 include states 530, 531, 532, 533, and 534. In states 530, 531, 532, and 533, the memory arbiter 300 assigns higher priority to non-AGP requests In state 534, AGP requests have the higher priority. Transitions occur whenever the memory arbiter 300 grants a memory request, and the destination states may depend on the value of Request Limit. Accordingly, both conditions on a given Arb4 transition arrow in FIG. 5 must be true for the state to change (i.e., the conditions are AND'ed). If either condition is false, Arb4 takes the default transition. Since all memory requests (besides refresh requests, which do not alter the arbitration priorities) can be categorized as either AGP requests or non-AGP requests, note that the granting of refresh requests necessarily induces the default paths in all states.

The Arb4 variable initially occupies state 530 at system bootup. If Request Limit equals zero, a non-AGP request will cause Arb4 to transition to state 534, in which AGP requests have priority over non-AGP requests. As long as Request Limit is greater than zero, Arb4 will move along states 531, 532, and 533, until the number of consecutive non-AGP requests reaches the Request Limit. When the memory controller has granted a number of consecutive non-AGP requests equal to Request Limit, any additional non-AGP request will advance Arb4 to state 534, where AGP requests have priority.

Beginning from state 530, assume that Request Limit equals three. If the memory controller 200 services an AGP request, Arb4 will remain at state 530. However, as soon as the memory controller 200 services a non-AGP request, Arb4 will advance to state 531. If Request Limit had been zero in this case, Arb4 would have moved to state 534 instead of state 531.

In state 531, non-AGP requests have priority over AGP requests, and one consecutive non-AGP request has been serviced. However, if the memory controller grants a non-AGP request, Arb4 will transition to state 532. Had Request Limit been one when the non-AGP request was granted, Arb4 would have moved to state 534 instead of state 532.

When Arb4 occupies state 532, non-AGP requests have priority over AGP requests, and two consecutive non-AGP requests have been serviced. However, if the memory controller grants a non-AGP request, Arb4 will progress to state 533. Had Request Limit been two in this case when the non-AGP request was granted, Arb4 would have moved directly to state 534 instead of state 533.

From state 533, non-AGP requests have priority over AGP requests, and three consecutive non-AGP requests have been granted. From state 533, a fourth consecutive non-AGP request will advance Arb4 to its final state, 534, where AGP requests have priority over non-AGP requests. In state 534, Arb4 assigns higher priority to AGP requests. If the memory arbiter 300 grants a non-AGP request (possibly because no AGP request is pending, for example), Arb4 remains in state 534. As soon as the memory arbiter 300 grants an AGP request, however, Arb4 reverts to its initial state 530, pending further arbitration cycles.

Neglecting refresh requests, it follows from FIG. 4 that the priority of the Arb4 variable depends on, at most, the four most recent arbitration winners, including the current arbitration winner and the three previous arbitration winners. If Request Limit is set to three, for example, indicating that the memory arbiter 300 processes four non-AGP requests for every one AGP request, then Arb4 awards priority to AGP requests during the following arbitration cycle only if the memory arbiter 300 granted a non-AGP request during the current cycle as well as during the three most recent cycles. If the memory arbiter 300 granted at least one AGP request during the current arbitration cycle or during any of the three previous cycles, then Arb4 gives priority to non-AGP requests during the next arbitration cycle after the AGP request.

Similarly, if Request Limit is set to two, then the priority of Arb4 is determined by only the three most recent requests, including the current arbitration winner and the two previous winners. Again neglecting refresh requests, Arb4 gives priority to AGP requests at the end of an arbitration cycle only if the current arbitration winner, as well as the two previous arbitration winners, were non-AGP requests. Conversely, Arb4 awards priority to non-AGP requests at the end of an arbitration cycle if the current winning request or either or both of the two previous arbitration winners were AGP requests. Both of the two previous arbitration winners might be AGP requests, for instance, if no non-AGP requests were pending during those cycles.

If Request Limit is one, then the priority of Arb4 is determined completely by the current arbitration winner and the previous winning request. If both the current and previous winning requests are non-AGP requests, then Arb4 gives priority to AGP requests for the next arbitration cycle. If the winning request is an AGP request during either the current arbitration cycle or the previous cycle, then Arb4 awards priority to non-AGP requests during the next cycle after the AGP request.

Finally, if Request Limit is zero, then the priority of Arb4 for the next arbitration cycle depends entirely on the winner of the current arbitration cycle. If the current arbitration winner is an AGP request, then Arb4 awards priority to non-AGP requests for the next cycle. If the winning request is a non-AGP request, however, then Arb4 gives priority to AGP requests during the next cycle. In this case, the state of Arb4 rotates between giving priority to AGP requests and then non-AGP requests, in a similar manner to the other adaptive variables Arb1, Arb2, and Arb3.

In an alternative embodiment based on the transitions of FIG. 5, each adaptive variable can occupy one of only two states. In the initial state, each adaptive variable awards priority according to the embodiment of FIG. 5. Thus, Arb1 initially awards group A requests priority over group B requests, Arb2 initially awards M2I requests priority over M2GI requests, Arb3 initially awards I2M requests priority over GI2M requests, and Arb4 initially awards non-AGP requests priority over AGP requests. In the alternate state, Arb1 awards group B requests priority over group A requests, Arb2 awards M2GI requests priority over M2I requests, Arb3 awards GI2M requests priority of I2M requests, and Arb4 awards AGP requests priority over non-AGP requests. In this alternative embodiment, two transition variables, n and k, are defined for each adaptive variable Arb1, Arb2, Arb3, and Arb4, and define the ratio of the number of winning requests that the memory arbiter 300 can award to one group of requests with the number of winning requests that the memory arbiter 300 can award to another group of requests. In particular, the adaptive variables transition between states such that the memory arbiter 300 chooses no more than n winning requests from the group having higher initial priority for every k winning requests chosen from the group having lower initial priority. For example, if Arb1 is assigned transition variables n=3 and k=2, then the memory arbiter 300 chooses no more than 3 winning requests from Group A for every 2 winning requests chosen from Group B.

Using this alternative embodiment, the memory arbiter 300 can award arbitration based solely on the most recent n+k−1 winning requests, including the current winning request. Specifically, if the memory arbiter 300 awarded fewer than n requests to the first group during the most recent n+k−1 winning requests, then the memory arbiter 300 must have awarded the winning request to the second group k or more times. Hence, the first group is awarded arbitration priority during the next cycle. Similarly, if the memory arbiter 300 has awarded fewer than k winning requests to the second group during the recent n+k−1 arbitration cycles, including the current cycle, then the second group is awarded higher priority during the next arbitration cycle. For example, if Arb2 (which determines the priority of requests within Group B) is assigned transition variables n=4 and k=3, then the memory arbiter 300 chooses the M2I request as the winning request no more than 4 times for every 3 times the M2GI request is chosen as the winning request. Thus, if fewer than n=4 of the previous n+k−1=6 winning requests chosen from group B are M2I requests, the memory arbiter awards priority to M2I requests during the next arbitration cycle. If fewer than k=3 of the previous 6 winning requests chosen from group B are M2GI requests, however, the memory arbiter awards priority to M2GI requests during the next arbitration cycle. The values n and k can be fixed or programmable. If programmable, the CPU 102 can reprogram the transition variables n and k at any time.

Although the transitions of adaptive variables Arb1, Arb2, Arb3, and Arb4 as defined with respect to FIG. 5 determine arbitration priorities in the preferred embodiment, it can be shown that the same priorities would result if each of these adaptive variables transitioned according the alternative embodiment, as described above. For instance, to arbitrate among Group A and Group B requests, the memory arbiter 300 awards priority to one Group A request for every one Group B request. Such a scheme is substantially the same as defining two transition variables n and k and setting n and k equal to 1, such that the memory arbiter 300 awards priority to n Group A requests for every k Group B requests. Accordingly, because n+k−1=1, the memory arbiter 300 would determine the priority of Group A and Group B based on only the most recent winning request (i.e., the current winning request). Thus, the preferred embodiment of Arb1 represents a special case of the alternative embodiment in which n and k are defined as n=k=1. Similarly, the preferred embodiment for determining the priority between M2I requests M2GI requests using adaptive variable Arb2 also represents a special case of the alternative embodiment in which the transition variables n and k assigned to Arb2 are set equal to 1. The value of Arb3, which determines the priority between I2M and GI2M requests, is another special case of the alternative embodiment in which the two transition variables n and k are set to n=k=1.

Finally, the preferred embodiment of determining whether Arb4 awards priority to AGP or non-AGP requests, as described with respect to FIG. 5, represents a special case of the alternative embodiment, in which n determines the number of non-AGP requests for every k AGP requests. In this case, n represents a number equal to Request Limit+1, and k is set to 1. If Request Limit=3, then n=4, and the memory arbiter 300 determines whether to award priority to an AGP request or to a non-AGP request during the next cycle based on the n+k−1=4 most recent winning requests. Accordingly, if fewer than k (1) of the four most recent requests was an AGP request, then the memory arbiter awards priority to AGP requests during the next arbitration cycle. If fewer than n (4) of the four most recent winning requests were non-AGP requests, however, then at least one of the four most recent requests was an AGP request. Thus, the memory arbiter 300 awards higher priority to non-AGP requests during the next arbitration cycle. Changing the value of n to determine the priority between AGP and non-AGP requests corresponds to changing the value of Request Limit by an equivalent amount. In the alternative embodiment, however, k may be programmed as well, and may be programmed to be larger or smaller than n or equal to n, as desired.

In this manner, the present invention is capable of fairly arbitrating among a plurality of memory cycle requests to ensure that no request becomes starved for memory access. By changing value according to the current and previous winning memory requests, the arbitration variables, Arb1, Arb2, Arb3, and Arb4, allow the memory arbiter 300 to implement an arbitration scheme that dynamically adapts to any sequence of memory requests. In addition, the Request Limit variable allows the memory arbiter 300 to consistently favor non-AGP requests over AGP requests without totally blocking memory access for AGP requests. This biasing scheme allows the computer system 100 more flexibility in dealing with different types of applications, including applications that need large amounts of immediate memory access and applications that need relatively slower access to main memory 106. The use of CAM hit signals introduces yet another dimension to the memory arbitration process, allowing the memory arbiter 300 to anticipate and prevent "dirty" memory reads by virtually any device. These features as well as numerous variations and modifications will become apparent to those skilled in the art once the above disclosure is fully appreciated. It is intended that the following claims be interpreted to embrace all such variations and modifications.

What is claimed is:

1. A method for adjusting an adaptive variable that represents the priority between a first group of requests and a second group of requests during a memory arbitration cycle in a computer system, the winning request chosen from the group with highest priority, including:

(a) determining the maximum number n, for n greater than 1, of consecutive winning requests that may be chosen from the first group;

(b) determining the maximum number k, for k greater than 1, of consecutive winning requests that may be chosen from the second group;

(c) determining how many of the n+k−1 most recent winning requests belong to the first request group;

(d) determining how many of the n+k−1 most recent winning requests belong to the second request group; and (e) adjusting the adaptive priority based on the n+k−1 most recent winning requests.

2. A method as in claim 1 including:

adjusting the adaptive priority during the current arbitration cycle to award priority to the second request group in a later arbitration cycle if fewer than k of the n+k−1 most recent winning requests belong to the second request group; and adjusting the adaptive priority during the current arbitration cycle to award priority to the first request group in a later arbitration cycle if fewer than n of the n+k−1 most recent winning requests belong to the first request group.

3. A method as in claim 1 including a value of n that is not equal to the value of k.

4. A method as in claim 1 including a value of n that is equal to the value of k.

5. A method as in claim 1 including a value of n that is programmable.

6. A method as in claim 1 including a value of k that is programmable.

7. A method as in claim 1 wherein the first request group of requests contains only a single request.

8. A method as in claim 7 wherein the second request group of requests contains only a single request.

9. A computer system comprising:

a memory device for storing data;

a processor coupled to said memory device and which transmits memory requests to said memory device;

a first master device coupled to said memory device via a first expansion bus, said first master device being capable of transmitting memory requests to said memory device;

a second master device coupled to said memory device via a second expansion bus, said second master device being capable of transmitting memory requests to said memory device; and a bridge logic coupled to said memory device, said processor, and said first expansion bus, said bridge logic comprising:
    a memory arbiter which classifies the memory requests into a first request group and a second request group, said memory arbiter capable of selecting one of the memory requests during an arbitration cycle as a winning request to transact with said memory device, wherein the winning request is selected based on an adaptive arbitration scheme which adapts according to the winning request,
    wherein the adaptive arbitration scheme includes a first adaptive variable that determines the priority between requests belonging to the first request group and requests belonging to the second request group;
    wherein said memory arbiter arbitrates between the first and second request groups by awarding no more than n number of winning requests to the first request group and no more than k number of winning requests to the second request group within a sequence of n+k−1 winning requests;
    wherein the first request group comprises a memory to processor read requests and memory to expansion bus read requests, the expansion bus read requests including read requests transmitted by said first and second master devices, and wherein the adaptive arbitration scheme further includes a second adaptive variable that determines the priority between the processor read request and the expansion bus read requests;
    wherein if said memory arbiter chooses a processor read request as the winning request during the current arbitration cycle, then said memory arbiter adjusts the second adaptive variable to award priority to the expansion bus read requests during the following arbitration cycle, and if said memory arbiter chooses an expansion bus read request as the winning request during the current arbitration cycle, then said memory arbiter adjusts the second adaptive variable to award priority to processor read requests during the following arbitration cycle;
    wherein the expansion bus read requests include a memory to PCI read request and a memory to GCI read request, and wherein the adaptive arbitration scheme includes a third adaptive variable that determines the priority between the PCI and GCI read requests; and
    a memory controller that receives the memory requests and asserts control, data, and address signals to said memory device to transact the winning request.

10. A computer system as in claim 9 wherein:
    if said memory arbiter chooses a PCI read request as the winning request during the current arbitration cycle, then said memory arbiter adjusts the third adaptive variable to award priority to GCI read requests during a later arbitration cycle;
    if said memory arbiter chooses a GCI read request as the winning request during the current arbitration cycle, then said memory arbiter adjusts the third adaptive variable to award priority to PCI read requests during a later arbitration cycle.

11. A computer system as in claim 10 wherein the first request group further includes expansion bus write requests to memory, and wherein said memory arbiter fixes the priority of expansion bus write requests below the priority of processor read requests and below the priority of expansion bus read requests.

12. A computer system as in claim 11 wherein the expansion bus write requests include a PCI write request and a GCI write request and wherein the adaptive arbitration scheme further includes a fourth adaptive variable that determines the priority between PCI and GCI write requests.

13. A computer system as in claim 12 wherein:
    if said memory arbiter chooses a PCI write request as the winning request during the current arbitration cycle, then said memory arbiter adjusts the fourth adaptive variable to award priority to GCI write requests during a later arbitration cycle;
    if said memory arbiter chooses a GCI write request as the winning request during the current arbitration cycle, then said memory arbiter adjusts the fourth adaptive variable to award priority to PCI write requests during a later arbitration cycle.

14. A computer system as in claim 13 wherein the first request group further includes a processor write request, and wherein said memory arbiter fixes the priority of processor write requests below the priority of processor read requests and above the priority of expansion bus read requests.

15. A computer system comprising:
    a memory device for storing data;
    a processor coupled to said memory device and which transmits memory requests to said memory device;
    a first master device coupled to said memory device via a first expansion bus, said first master device being capable of transmitting memory requests to said memory device; and
    a bridge logic coupled to said memory device, said processor, and said first expansion bus, said bridge logic comprising:
        a memory arbiter which classifies the memory requests into a first request group, a second request group and a third memory request group, said memory arbiter capable of selecting one of the memory requests during an arbitration cycle as a winning request to transact with said memory device, wherein the winning request is selected based on an adaptive arbitration scheme which adapts according to the winning request;
    wherein the adaptive arbitration scheme includes a first adaptive variable that determines the priority between requests belonging to the first request group and requests belonging to the second request group, and wherein said memory arbiter fixes the priority of the third memory request group below the priority of the first memory request group and below the priority of the second memory request group;
    wherein the second memory request group includes a PCI request and a GCI request, and wherein said memory arbiter arbitrates between PCI and GCI requests by awarding no more than n number of winning requests to PCI requests and no more than k number of winning requests to GCI requests throughout a sequence of n+k−1 winning requests; and
    a memory controller that receives the memory requests and asserts control, data, and address signals to said memory device to transact the winning request.

16. A computer system as in claim 15 wherein n does not equal k.

17. A computer system as in claim 15 wherein n equals k.

18. A computer system as in claim 15 wherein n is programmable.

19. A computer system as in claim 15 wherein k is programmable.

20. A computer system comprising:

a memory device for storing data;

a processor coupled to said memory device and which transmits memory requests to said memory device;

a first master device coupled to said memory device via a first expansion bus, said first master device being capable of transmitting memory requests to said memory device;

a second master device coupled to said memory device via a second expansion bus, said second master device being capable of transmitting memory requests to said memory device; and a bridge logic connected to said memory device, said processor, said first expansion bus, and said second expansion bus, said bridge logic comprising:

a memory arbiter that classifies the memory requests into at least a first request group and a second request group, awards memory access to one of the memory requests based on a set of flexible arbitration rules, and alters the arbitration rules based on which memory request is awarded memory access, and wherein the flexible arbitration rules determine the priority between the first request group the second request group to be awarded memory access;

wherein said memory arbiter arbitrates between the first and second request groups by awarding no more than n number of memory accesses to the first request group and no more than k number of memory accesses to the second request group throughout a sequence of n+k−1 memory accesses;

wherein the first request group includes PCI read requests and GCI read requests and wherein the flexible arbitration rules determine the memory access priority among the expansion bus read requests;

said memory arbiter alternates between awarding memory access to PCI requests and awarding memory access to GCI requests; and a memory controller that asserts appropriate signals to said memory device to perform the memory accesses.

21. A computer system comprising:

a memory device for storing data;

a processor coupled to said memory device and which transmits memory requests to said memory device;

a first master device coupled to said memory device via a first expansion bus, said first master device being capable of transmitting memory requests to said memory device; and a second master device coupled to said memory device via a second expansion bus, said second master device being capable of transmitting memory requests to said memory device; and a bridge logic connected to said memory device, said processor, said first expansion bus, and said second expansion bus, said bridge logic comprising:

a memory arbiter that classifies the memory requests into at least a first request group and a second request group, determines priority and awards memory access to one of the memory request based on a set of flexible arbitration rules, and alters the arbitration rules based on which memory request is awarded memory access;

wherein said memory arbiter arbitrates between the first and second request groups by awarding no more than n number of memory accesses to the first request group and no more than k number of memory accesses to the second request group throughout a sequence of n+k−1 memory accesses;

wherein the first request group includes expansion bus read requests, processor requests and expansion bus write requests, and wherein the flexible arbitration rules determine the memory access priority among the processor requests, among the expansion bus read requests, and among the expansion bus write requests;

the expansion bus write requests include PCI write requests and GCI write requests, and said memory arbiter alternates between awarding memory access to PCI requests and awarding memory access to GCI requests; and a memory controller that asserts appropriate signals to said memory device to perform the memory accesses.

22. A method for selecting a memory request to service among a plurality of pending memory requests in a computer system comprising:

classifying the memory requests into a first request group and a second request group based on request type, and determining the priority between the first request group and the second request group based on a first adaptive variable;

(b) dividing memory requests within the first request group into processor read requests and expansion bus read requests, and determining the priority between the processor read requests and the expansion bus read requests based on a second adaptive variable;

(c) dividing the expansion bus read requests into PCI read requests and GCI read requests, and determining the priority among expansion bus read requests based on a third adaptive variable;

(d) selecting one of the memory requests as a winning request based on a set of predetermined arbitration rules; and (f) adjusting the arbitration rules based on which request was selected as the winning request by:

(f1) adjusting the third adaptive variable during the current arbitration cycle to award priority to the GCI read requests in a later arbitration cycle if the winning request is a PCI read request for the current arbitration cycle; and (f2) adjusting the third adaptive variable during the current arbitration cycle to award priority to the PCI read requests in a later arbitration cycle if the winning request is a GCI read request for the current arbitration cycle.

23. A method for selecting a memory request to service among a plurality of pending memory requests in a computer system comprising:

(a) classifying the memory requests into a first request group and a second request group based on request type, and determining the priority between the first request group and the second request group based on a first adaptive variable;

(b) dividing memory requests within the first request group into processor read requests and expansion bus read requests, and determining the priority between the processor read requests and the expansion bus read requests based on a second adaptive variable;

(c) classifying expansion bus write requests into the first request group, and including using a fourth adaptive variable to arbitrate among expansion bus write requests;

(d) dividing the expansion bus write requests into PCI write requests and GCI write requests;

(e) selecting one of the memory requests as a winning request based on a set of predetermined arbitration rules; and (f) adjusting the arbitration rules based on which request was selected as the winning request by:
 (f1) adjusting the second adaptive variable during the current arbitration cycle to award priority to expansion bus read requests in a later arbitration cycle if a processor read request is chosen as the winning request for the current arbitration cycle;
 (f2) adjusting the second adaptive variable during the current arbitration cycle to award priority to processor read requests in a later arbitration cycle if an expansion bus read request is chosen as the winning request for the current arbitration cycle;
 (f3) adjusting the fourth adaptive variable during the current arbitration cycle to award priority to a PCI write requests in a later arbitration cycle if a GCI write request is chosen as the winning request for the current arbitration cycle; and
 (f4) adjusting the fourth adaptive variable during the current arbitration cycle to award priority to the GCI write requests in a later arbitration cycle if a PCI write request is chosen as the winning request for the current arbitration cycle.

24. A method as in claim 23 further including classifying processor write requests into the first request group and assigning a fixed priority to processor write requests with respect to the priorities of all other requests within the first request group.

25. A method for prioritizing pending memory requests in a computer system comprising:

classifying the pending memory requests into memory request groups, the memory request groups including a first request group and a second request group;

using a first adaptive variable to determine the priority between the first and second request groups;

choosing a winning request from the pending memory requests;

adjusting the first adaptive variable based on the winning request;

dividing the first request group into processor requests, expansion bus read requests, and expansion bus write requests;

using a second adaptive variable to arbitrate between processor requests and expansion bus read requests;

fixing the priority of the expansion bus write requests with respect to the processor request and expansion bus read request priorities;

dividing the expansion bus write requests into PCI write requests and GCI write requests;

using a third adaptive variable to arbitrate between GCI write requests and PCI write requests; and adjusting the third adaptive variable based on the winning request.

26. A method as in claim 25 including:

adjusting the third adaptive variable to award priority to GCI write requests if the winning request is a PCI write request; and adjusting the third adaptive variable to award priority to PCI write requests if the winning request is a GCI write request.

* * * * *